(12) United States Patent
Ueno et al.

(10) Patent No.: US 9,467,683 B2
(45) Date of Patent: Oct. 11, 2016

(54) DISPLAY DEVICE HAVING THREE-DIMENSIONAL DISPLAY FUNCTION

(75) Inventors: Yasuhiro Ueno, Yokohama (JP); Shigeki Tanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 600 days.

(21) Appl. No.: 13/590,469

(22) Filed: Aug. 21, 2012

(65) Prior Publication Data

US 2013/0050202 A1 Feb. 28, 2013

(30) Foreign Application Priority Data

Aug. 23, 2011 (JP) .................................. 2011-181949

(51) Int. Cl.
*G06T 15/00* (2011.01)
*H04N 13/04* (2006.01)
*G06F 3/044* (2006.01)

(52) U.S. Cl.
CPC .............. *H04N 13/04* (2013.01); *G06F 3/044* (2013.01); *G06F 2203/04101* (2013.01)

(58) Field of Classification Search
None
See application file for complete search history.

(56) References Cited

U.S. PATENT DOCUMENTS

| | | | | |
|---|---|---|---|---|
| 5,588,098 A | * | 12/1996 | Chen et al. | 345/653 |
| 5,844,547 A | * | 12/1998 | Minakuchi et al. | 345/173 |
| 6,046,726 A | * | 4/2000 | Keyson | G06F 3/011 345/156 |
| 2008/0225059 A1 | * | 9/2008 | Lowe | H04N 13/0497 345/626 |
| 2010/0053151 A1 | * | 3/2010 | Marti et al. | 345/419 |
| 2010/0125812 A1 | * | 5/2010 | Hartman | G02B 27/01 715/848 |
| 2010/0245352 A1 | * | 9/2010 | Chakraborty | 345/421 |
| 2011/0018966 A1 | * | 1/2011 | Kitazato | 348/43 |
| 2011/0084893 A1 | * | 4/2011 | Lee et al. | 345/6 |
| 2011/0115784 A1 | * | 5/2011 | Tartz | G06F 1/1624 345/419 |
| 2011/0163946 A1 | * | 7/2011 | Tartz et al. | 345/156 |
| 2011/0164029 A1 | * | 7/2011 | King et al. | 345/419 |
| 2011/0187706 A1 | * | 8/2011 | Vesely et al. | 345/419 |
| 2011/0216206 A1 | * | 9/2011 | Ashforth et al. | 348/207.1 |
| 2012/0069055 A1 | * | 3/2012 | Otsuki | G06F 3/017 345/681 |
| 2012/0105487 A1 | * | 5/2012 | Son et al. | 345/671 |
| 2012/0200495 A1 | * | 8/2012 | Johansson | G06F 3/011 345/156 |
| 2012/0229377 A1 | * | 9/2012 | Kim | G06F 3/017 345/157 |
| 2013/0207896 A1 | * | 8/2013 | Robinson et al. | 345/158 |

FOREIGN PATENT DOCUMENTS

| | | | |
|---|---|---|---|
| JP | 2011-095547 A | 5/2011 | |
| WO | WO 2011044936 A1 * | 4/2011 | G06F 3/011 |

OTHER PUBLICATIONS

Office Action mailed Nov. 4, 2014 in corresponding Japanese patent application No. 2011-181949.

* cited by examiner

Primary Examiner — Anh-Tuan V Nguyen
(74) Attorney, Agent, or Firm — Hauptman Ham, LLP

(57) ABSTRACT

According to an aspect, a display device includes a display unit, a detecting, and a control unit. The display unit has a display surface and is configured to three-dimensionally display a display object in a space on a back face side of the display surface. The detecting unit detects an action of an object in the space on the back face side. When the detecting unit detects a predetermined action of the object in the space on the back face side, the control unit changes the display object in the space on the back face side according to the predetermined action.

8 Claims, 36 Drawing Sheets

FIG.7
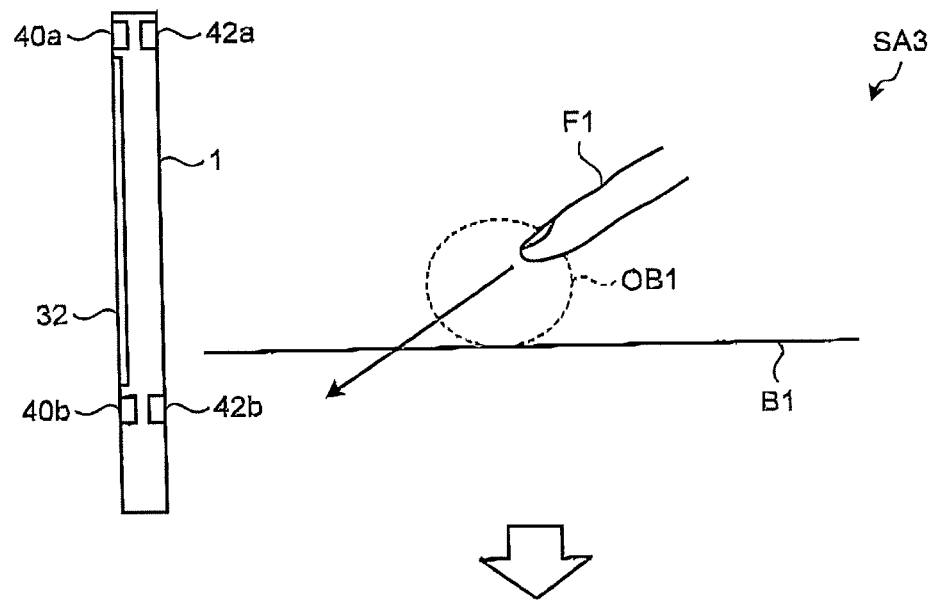
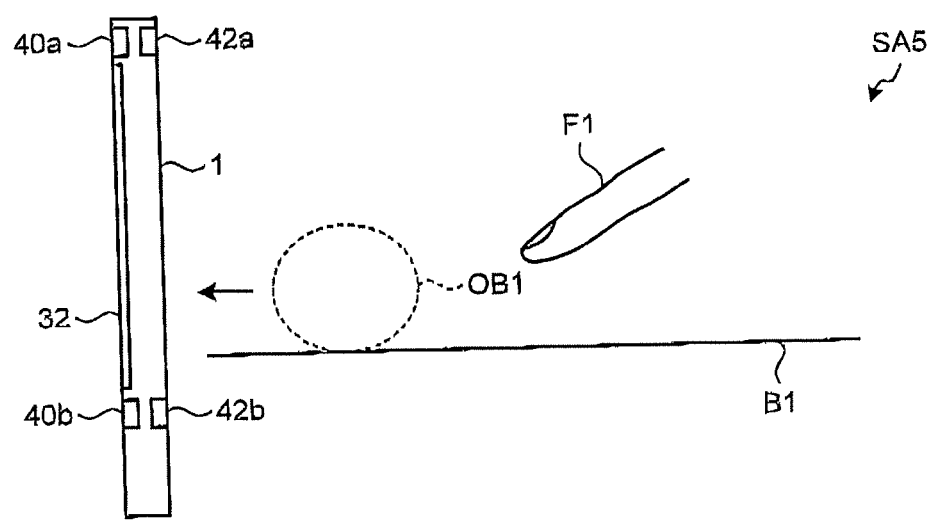

FIG.9

| TYPE | FULCRUM | OBSTACLE | PUSHED SPEED | CHANGE |
|---|---|---|---|---|
| RIGID BODY | NOT EXIST | NOT PRESENT | * | IT IS MOVED IN THE PUSHED DIRECTION ACCORDING TO A PUSHED AMOUNT. |
| | | FIXED OBSTACLE | * | IT IS MOVED IN THE PUSHED DIRECTION ACCORDING TO A PUSHED AMOUNT. IT IS NOT MOVED AFTER COMING IN CONTACT WITH THE OBSTACLE. |
| | | OTHER RIGID BODY | LOW | IT IS MOVED IN THE PUSHED DIRECTION ACCORDING TO A PUSHED AMOUNT. AFTER COMING IN CONTACT WITH OTHER RIGID BODY, IT IS MOVED TOGETHER WITH THE OTHER RIGID BODY. |
| | | | HIGH | IT IS MOVED IN THE PUSHED DIRECTION ACCORDING TO A PUSHED AMOUNT. ON CONTACT WITH OTHER RIGID BODY, IT FLICKS AWAY THE OTHER RIGID BODY. |
| | | OTHER RIGID BODY (WHICH CAN BE PASSED THROUGH) | * | IT IS MOVED IN THE PUSHED DIRECTION ACCORDING TO A PUSHED AMOUNT. ON CONTACT WITH OTHER RIGID BODY, IT IS MOVED SO AS TO PASS THROUGH THE OTHER RIGID BODY. |
| | EXIST | NOT PRESENT | * | IT IS ROTATED AROUND THE FULCRUM. |

FIG.10

| TYPE | MATERIAL | CHANGE AMOUNT | PUSHED SPEED | CHANGE |
|---|---|---|---|---|
| ELASTIC BODY | RUBBER-BASED | WITHOUT LIMITATION | LOW | IT IS DEFORMED IN THE PUSHED DIRECTION ACCORDING TO A PUSHED AMOUNT. WHEN RELEASED, IT RETURNS TO ITS ORIGINAL SHAPE. |
| | | | HIGH | IT IS DEFORMED IN THE PUSHED DIRECTION ACCORDING TO A PUSHED AMOUNT. THEN, IT IS MOVED WHILE RETURNING TO ITS ORIGINAL SHAPE. |
| | | WITH LIMITATION | * | IT IS DEFORMED IN THE PUSHED DIRECTION WITHIN A CHANGEABLE RANGE ACCORDING TO A PUSHED AMOUNT. THEN, IT IS MOVED WHILE RETURNING TO ITS ORIGINAL SHAPE. |
| | METAL-BASED | WITH LIMITATION | * | WHEN IT IS PUSHED IN A DEFORMABLE DIRECTION, IT IS DEFORMED IN THE PUSHED DIRECTION WITHIN A CHANGEABLE RANGE ACCORDING TO A PUSHED AMOUNT. WHEN RELEASED, RETURNING TO ITS ORIGINAL SHAPE AND DEFORMATION ARE REPEATED (VIBRATED). WHEN IT IS PUSHED IN ANY DIRECTION OTHER THAN THE DEFORMABLE DIRECTION, IT IS MOVED SIMILARLY TO THE RIGID BODY. |

| TYPE | CHANGE |
|---|---|
| PLASTIC BODY | ENTIRE SHAPE IS DEFORMED SO THAT THE PUSHED PORTION DENTS. |

| TYPE | PUSHED SPEED | CHANGE |
|---|---|---|
| LIQUID | LOW | OBJECT IS SOAKED IN LIQUID. |
| | MEDIUM | OBJECT IS SOAKED IN LIQUID. RIPPLES SPREAD ACROSS THE LIQUID. |
| | HIGH | OBJECT IS SOAKED IN LIQUID. WATER SPLASHES. |

FIG.13

| TYPE | PUSHED SPEED | CHANGE |
|---|---|---|
| GAS | LOW | IT IS BLOCKED BY THE OBJECT (TO FLOAT AROUND THE PERIPHERY THEREOF). |
| | MEDIUM | IT IS SCATTERED. |
| | HIGH | EDDY IS PRODUCED DUE TO TURBULENT FLOW IN THE BACK SIDE OF THE MOVING DIRECTION OF THE OBJECT. |

FIG.14

| TYPE | COMBINATION OF ELEMENTS | CHANGE |
|---|---|---|
| AGGREGATION | NOT COMBINED | ENTIRE SHAPE AS AN AGGREGATION IS DEFORMED SO THAT THE PUSHED PORTION DENTS. |
| | COMBINED | ENTIRE SHAPE AS AN AGGREGATION IS DEFORMED SO THAT THE PUSHED PORTION DENTS. ELEMENTS OTHER THAN THE PUSHED PORTION ARE PULLED BY THE ELEMENT AT THE PUSHED PORTION AND ARE MOVED. |
| | NOT COMBINED (THERE IS ATTRACTIVE FORCE OR REPULSIVE FORCE BETWEEN THE ELEMENTS AND THE OBJECT) | WHEN THERE IS ATTRACTIVE FORCE, THE ELEMENTS WITHIN A PREDETERMINED DISTANCE TO THE OBJECT ARE ATTRACTED TO THE OBJECT WITHOUT CONTACTING THE OBJECT. WHEN THERE IS REPULSIVE FORCE, THE ELEMENTS WITHIN A PREDETERMINED DISTANCE TO THE OBJECT ARE REPELLED FROM THE OBJECT WITHOUT CONTACTING THE OBJECT. |

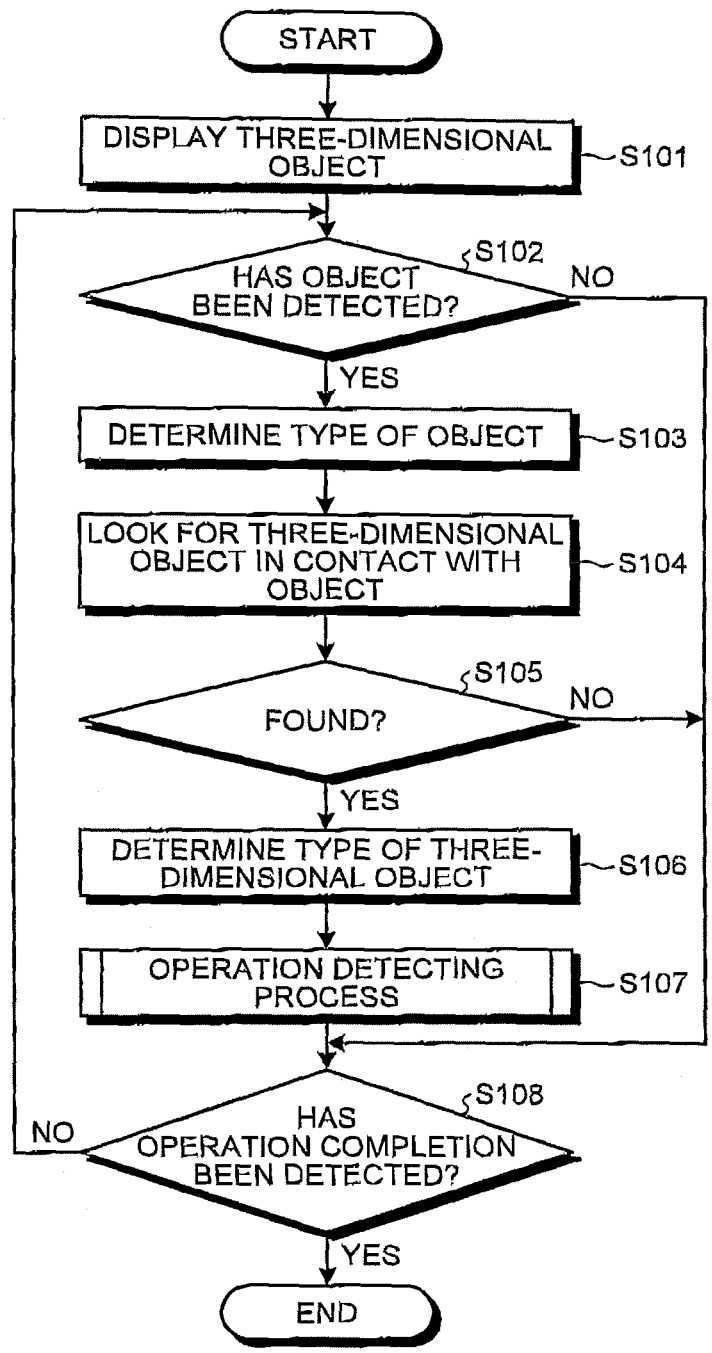

DISPLAY DEVICE HAVING THREE-DIMENSIONAL DISPLAY FUNCTION

CROSS-REFERENCE TO RELATED APPLICATIONS

This application claims priority from Japanese Application No. 2011-181949, filed on Aug. 23, 2011, the content of which is incorporated by reference herein in its entirety.

BACKGROUND

1. Technical Field

The present disclosure relates to a display device.

2. Description of the Related Art

Some display devices with a display unit such as mobile phones can three-dimensionally display an image and so on (see e.g., Japanese Patent Application Laid-open No. 2011-95547). The three-dimensional display is implemented by using binocular disparity.

The three-dimensional display is a user-friendly display manner; however, it has been used just for viewing purposes, and has not been used for improving the convenience of operations.

For the foregoing reasons, there is a need for a display device that can provide the user with convenient operations.

SUMMARY

According to an aspect, a display device includes a display unit, a detecting, and a control unit. The display unit has a display surface and is configured to three-dimensionally display a display object in a space on a back face side of the display surface. The detecting unit detects an action of an object in the space on the back face side. When the detecting unit detects a predetermined action of the object in the space on the back face side, the control unit changes the display object in the space on the back face side according to the predetermined action.

BRIEF DESCRIPTION OF THE DRAWINGS

FIG. 7 is a diagram for explaining detection of an operation of pushing the three-dimensional object and changes of the three-dimensional object according to the detected operation;

FIG. 9 is a diagram of an example of information stored in action data;

FIG. 10 is a diagram of another example of the information stored in the action data;

FIG. 11 is a diagram of still another example of the information stored in the action data;

FIG. 12 is a diagram of still another example of the information stored in the action data;

FIG. 13 is a diagram of still another example of the information stored in the action data;

FIG. 14 is a diagram of still another example of the information stored in the action data;

FIG. 15 is a flowchart of a procedure of a contact detecting process according to the first embodiment;

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the display device; however, the present invention is not limited to mobile phones. Therefore, the present invention can be applied to a variety of devices, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
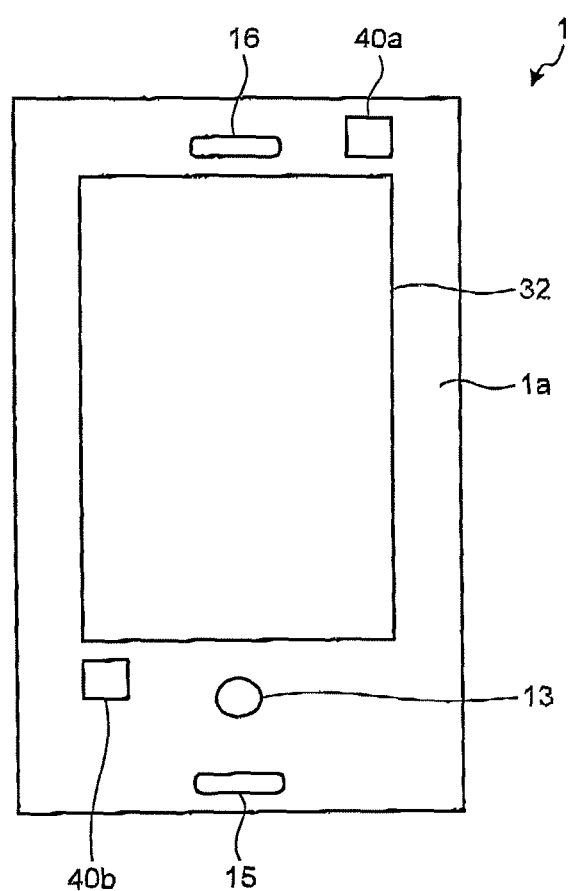
FIG. 1 is a front view of a mobile phone according to a first embodiment.
Figure 2:
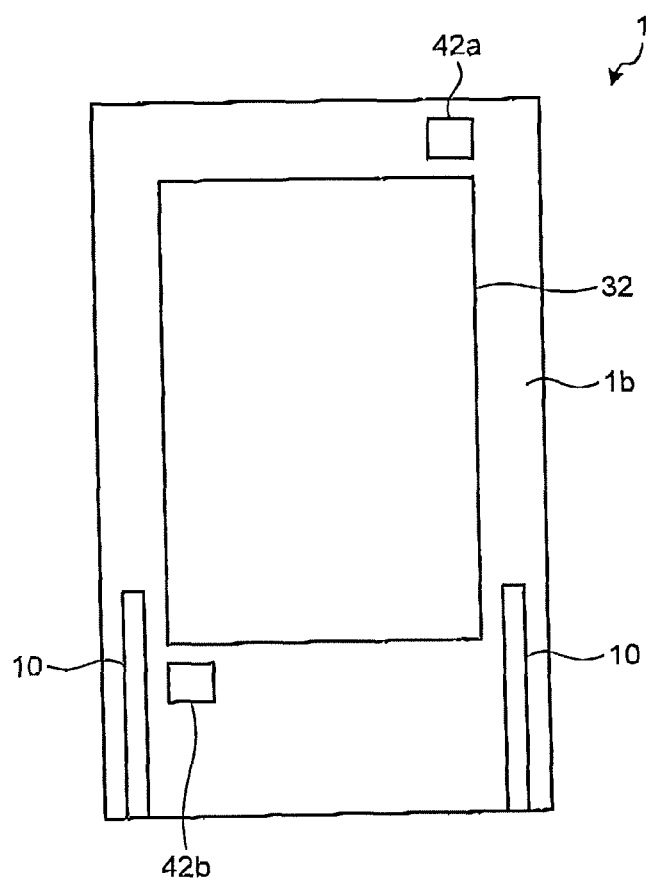
FIG. 2 is a back view of the mobile phone according to the first embodiment.
Figure 3:
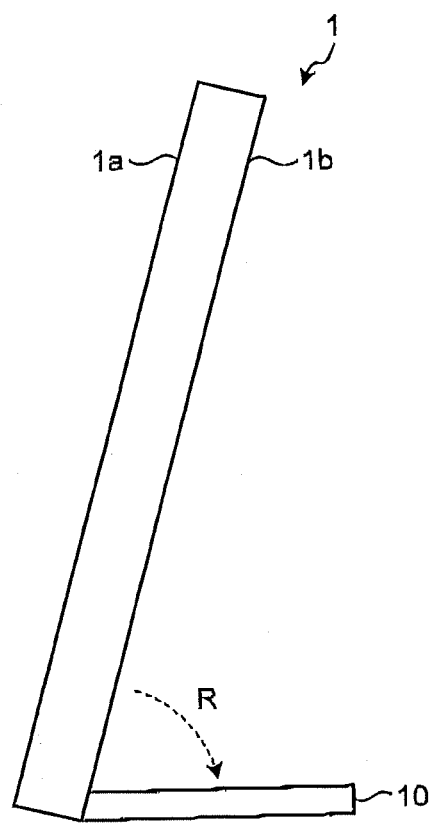
FIG. 3 is a side view of the mobile phone placed upright.
Figure 4:
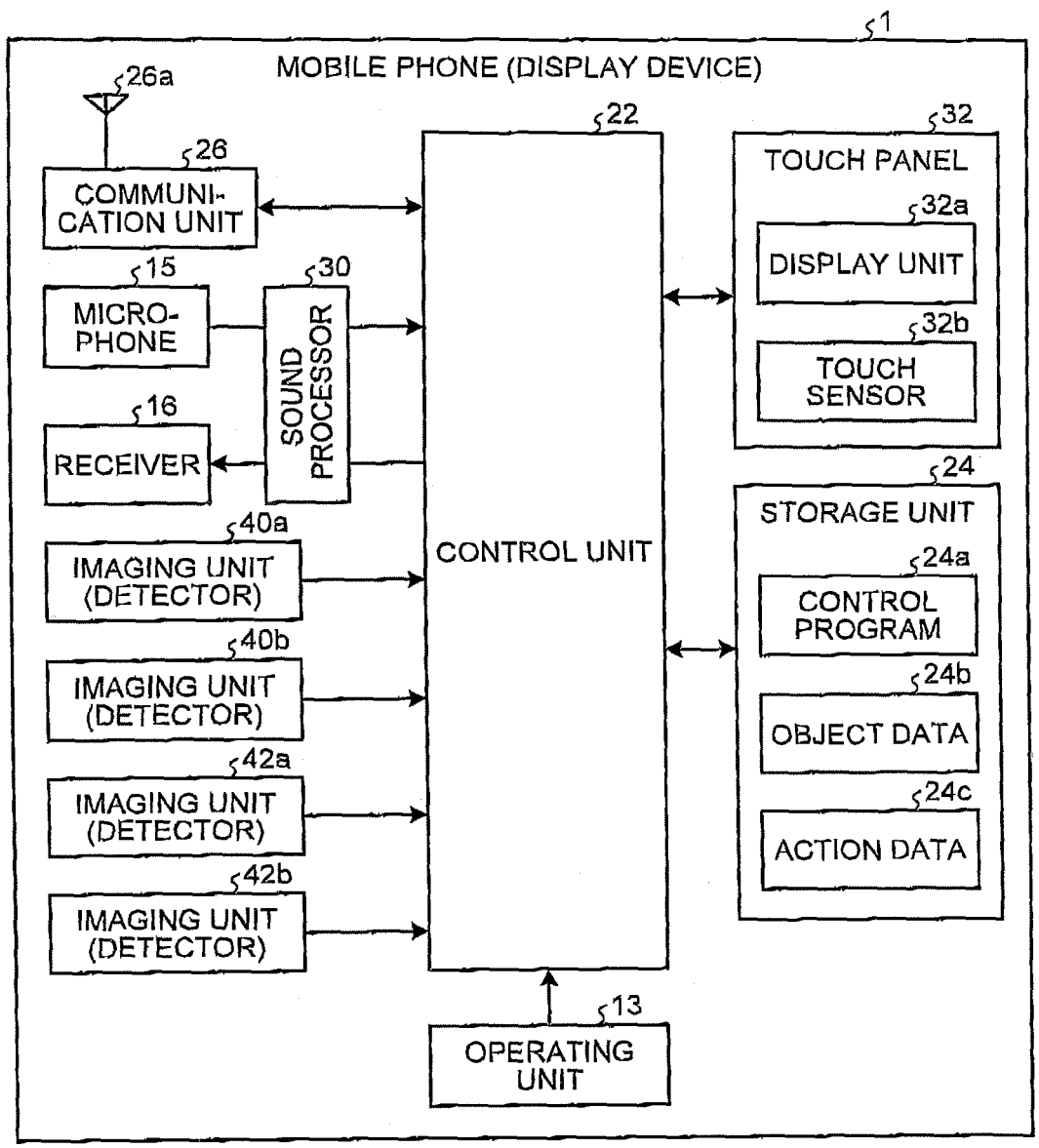
FIG. 4 is a block diagram of the mobile phone according to the first embodiment.

First of all, the configuration of a mobile phone (display device) 1 according to a first embodiment is explained below with reference to FIG. 1 to FIG. 4. FIG. 1 is a front view of the mobile phone 1. FIG. 2 is a back view of the mobile phone 1. FIG. 3 is a side view of the mobile phone 1 placed upright. FIG. 4 is a block diagram of the mobile phone 1.

As illustrated in FIG. 1 to FIG. 4, the mobile phone 1 includes a stand portion 10, an operating unit 13, a microphone 15, a receiver 16, a control unit 22, a storage unit 24, a communication unit 26, a sound processor 30, a touch panel 32, an imaging unit 40a, an imaging unit 40b, an imaging unit 42a, and an imaging unit 42b. The operating unit 13, the microphone 15, the receiver 16, the imaging unit 40a, and the imaging unit 40b are provided on a front face 1a of the mobile phone 1. The stand portion 10, the imaging unit 42a, and the imaging unit 42b are provided on a back face 1b of the mobile phone 1.

The stand portion 10 is embedded in the back face 1b pivotally at one of its ends as a hinge. As illustrated in FIG. 3, the stand portion 10 is pivoted by an angle R, so that the mobile phone 1 can stand at an arbitrary angle without contacting both the front face 1a and the back face 1b with a base such as a table. The stand portion 10 has only to have a structure in which at least the touch panel 32 (a display unit 32a) can stand, and therefore it is not limited to the structure illustrated in FIG. 2 and FIG. 3. For example, the stand portion 10 may be removable from the mobile phone 1. The angle R may be, for example, 0°, 30°, 60°, 90°, 270°, 300°, or 330°.

The operating unit 13 has physical buttons, and outputs a signal corresponding to a pressed button to the control unit 22. In the example illustrated in FIG. 1, the operating unit 13 has only one button, however, may have a plurality of buttons.

The microphone 15 acquires an external sound. The receiver 16 outputs a voice of a call partner during a phone call. The sound processor 30 converts the sound input from the microphone 15 to a digital signal and outputs the digital signal to the control unit 22. The sound processor 30 also decodes a digital signal input from the control unit 22 and outputs the decoded signal to the receiver 16.

The communication unit 26 includes an antenna 26a, and establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 26.

The touch panel 32 displays various pieces of information such as characters, graphics, and images, and detects contact (s) of object(s). The touch panel 32 is structured with the display unit 32a and a touch sensor 32b so as to overlap each other.

The display unit 32a includes a display device such as a liquid crystal display (LCD) or an organic electro-luminescence display (OELD), and displays various pieces of information according to a control signal input from the control unit 22. The touch sensor 32b detects contact(s) with the surface of the touch panel 32, and outputs a signal corresponding to the detected contact(s) to the control unit 22; thereby, the control unit 22 determines (detects) an input operation performed for the touch panel 32. The detection method in which the touch sensor 32b detects the contact may be any one of methods such as a capacitive type detection method, a resistive type detection method, and a pressure sensitive type detection method.

The display unit 32a and the touch sensor 32b are made of a transparent member. The touch panel 32 is provided in a hollow portion extending from the front face 1a to the back face 1b. Therefore, even when looking at the mobile phone 1 from the front face 1a side or even when looking at the mobile phone 1 from the back face 1b side, the user can see the other side of the mobile phone 1 through the touch panel 32. The touch panel 32 is not necessarily fully transparent, and therefore the touch panel 32 has only to pass at least some of light on the back face 1b side to the front face 1a side. That is, it is only necessary to form the touch panel 32 so that the user can recognize an object behind the touch panel 32 when looking at the touch panel 32 from the front face 1a side.

The touch panel 32 can display a three-dimensional object. The three-dimensional object is a display object such as an image and a shape created so as to look as if the display object is three-dimensional using disparity. The touch panel 32 can display the three-dimensional object as if it jumps out of the touch panel 32 toward the front. The touch panel 32 can also display the three-dimensional object as if it is in a more backward space than the touch panel 32. The method of displaying the three-dimensional object may be a method of realizing a stereoscopic vision using a tool such as glasses, or may be a method of realizing a stereoscopic vision with the naked eye.

Each of the imaging units 40a, 40b, 42a, and 42b electronically captures an image using an image sensor such as a charge-coupled device (CCD) image sensor or a complementary metal oxide semiconductor (CMOS) image sensor. Each of the imaging units 40a, 40b, 42a, and 42b converts a captured image to a signal and outputs the signal to the control unit 22. The imaging units 40a, 40b, 42a, and 42b each function as a detector that detects object(s) for selecting and operating a three-dimensional object in a space in which the three-dimensional object is stereoscopically displayed (hereinafter, "visual space" or "three-dimensional space").

The imaging unit 40a and the imaging unit 40b capture an object located in the three-dimensional space on the front face 1a side. The imaging unit 42a and the imaging unit 42b capture an object located in the three-dimensional space on the back face 1b side. The imaging units 40a, 40b, 42a, and 42b may be configured to set a field angle and layout so that, even if an object such as a finger is located in any part of the three-dimensional space, the object can be captured. The imaging units 40a, 40b, 42a, and 42b may be a device that captures an image of visible light or may be a device that captures an image of invisible light such as infrared rays.

The control unit 22 includes a central processing unit (CPO) being a processing unit and a memory being a storage unit, and implements various functions by executing programs using these hardware resources. Specifically, the control unit 22 reads a program and/or data stored in the storage unit 24 to load it to the memory, and causes the CPU to execute instructions contained in the program loaded to the memory. The control unit 22 performs read/write of data from/to the memory and the storage unit 24 and controls operations of the communication unit 26, the display unit 32a, and the like according to the execution result of the instructions executed by the CPU. When the CPU executes instructions, the data loaded to the memory and the signal input from the touch sensor 32b or so are used as part of parameters and determination conditions.

The storage unit 24 includes one or more non-transitory storage medium, for example, a nonvolatile memory (such as ROM, EPROM, flash card etc.) and/or a storage device (such as magnetic storage device, optical storage device, solid-state storage device etc.), and stores therein various programs and data. Examples of the program stored in the storage unit 24 include a control program 24a. Examples of the data stored in the storage unit 24 include object data 24b and action data 24c. The storage unit 24 may include a combination of a portable storage medium such as a memory card and a reader/writer for reading/writing data from/to the storage medium. In this case, the control program 24a, the object data 24b, and the action data 24c may be stored in the storage medium. The control program 24a, the object data 24b, and the action data 24c may be acquired from any other device such as a server through wireless communication performed by the communication unit 26.

The control program 24a provides functions for various controls to operate the mobile phone 1. Examples of the function provided by the control program 24a include a function for controlling a display of a three-dimensional object on the touch panel 32 and a function for detecting a user's operation performed for the three-dimensional object displayed by the touch panel 32.

The object data 24b contains information for shapes and characteristics of a three-dimensional object. The object data 24b is used to display the three-dimensional object. The action data 24c contains information for how an operation performed for a displayed three-dimensional object acts for the three-dimensional object. When the operation performed for the displayed three-dimensional is detected, the action data 24c is used to change the three-dimensional object. The change mentioned here includes movement, rotation, deformation, deletion, and so on.

Figure 5:
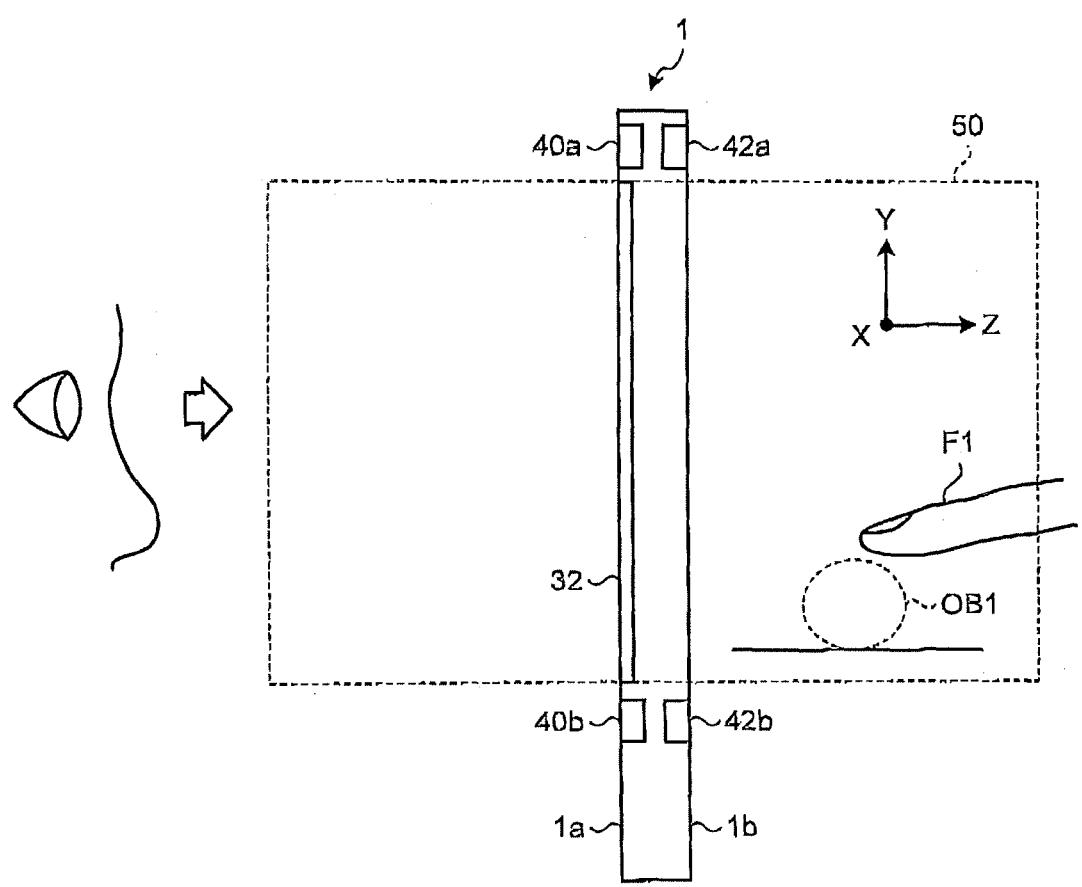
FIG. 5 is a diagram for explaining a display of a three-dimensional object and an operation performed for the three-dimensional object.

Then, a display of a three-dimensional object and an operation performed for the three-dimensional object are explained with reference to FIG. 5. FIG. 5 is a diagram for explaining a display of a three-dimensional object and an operation performed for the three-dimensional object. As illustrated in FIG. 5, a three-dimensional space 50, in which the touch panel 32 can stereoscopically display a three-dimensional object, expands to the front face 1a side and to the back face 1b side based on the touch panel 32 as a reference. In the example illustrated in FIG. 5, the three-dimensional object OB1 is displayed in a more backward space than the touch panel 32 when viewed from the user on the front face 1a side.

In the example of FIG. 5, the user moves a finger F1 to an area where the three-dimensional object OB1 is displayed, and is about to operate the three-dimensional object OB1 with the finger F1. The mobile phone 1 detects a position and an operation of an object such as the finger F1 based on images captured by the imaging units 42a and 42b. When it is determined that the operation has been performed for the three-dimensional object OB1 by the object such as the finger F1 based on the result of detection, the mobile phone 1 changes the three-dimensional object OB1 according to the operation.

To perform an operation with the finger F1 on the back face 1b side of the mobile phone 1, the user may make the mobile phone 1 self-standing using the stand portion 10. In this case, the user can perform an operation for the three-dimensional object using both hands. The user may hold the mobile phone 1 by one hand and perform an operation by the finger(s) of the other hand.

The touch panel 32 can also display the three-dimensional object in a more forward space than the touch panel 32 when viewed from the user on the front face 1a side. The mobile phone 1 detects a position and an operation of the object that operates the three-dimensional object displayed on the front face 1a side of the touch panel 32 based on images captured by the imaging units 40a and 40b. When it is determined that the operation has been performed for the three-dimensional object OB1 based on the result of detection, the mobile phone 1 changes the three-dimensional object OB1 according to the operation.

In this way, the mobile phone 1 accepts a user's operation performed for the three-dimensional object displayed on the front face 1a side and the back face 1b side of the touch panel 32. If the touch panel 32 is transparent or half-transparent and an operation is performed for the three-dimensional object OB1 displayed on the back face 1b side of the touch panel 32 by the finger F1, the user can check the position and the operation of the finger F1 through the touch panel 32. Moreover, in this case, the finger F1 is not located between the touch panel 32 and user' eyes. Therefore, such inconvenience that the finger F1 prevents the user from seeing the three-dimensional object OB1 does not occur.

Figure 6:
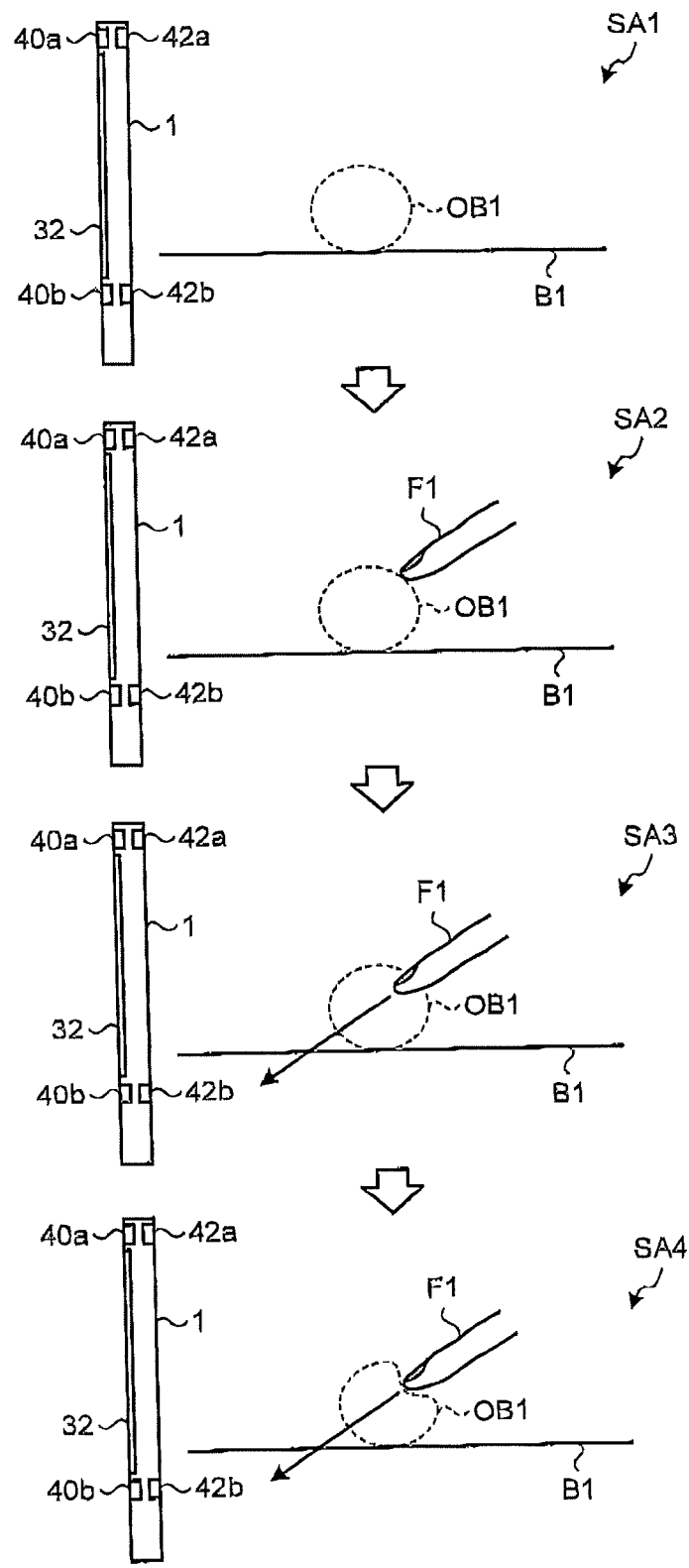
FIG. 6 is a diagram for explaining detection of an operation of pushing the three-dimensional object and changes of the three-dimensional object according to the detected operation.

Then, detection of an operation of pushing a three-dimensional object and changes of the three-dimensional object according to the detected operation are explained with reference to FIG. 6 and FIG. 7. FIG. 6 and FIG. 7 are diagrams for explaining detection of an operation of pushing the three-dimensional object and changes of the three-dimensional object according to the detected operation. At Step SA1 in FIG. 6, the touch panel 32 stereoscopically displays a three-dimensional object OB1 in the three-dimensional space on the back face 1b side. The three-dimensional object OB1 is, for example, an object resembling a ball. At Step SA1, the touch panel 32 also displays a bottom surface B1 supporting the three-dimensional object OB1.

At Step SA2, the user places the finger F1 on a position in contact with the three-dimensional object OB1 and keeps the finger F1 still as it is. When an actual object is detected in the three-dimensional space and a state of the object in contact with the three-dimensional object OB1 continues a longer period of time than a predetermined time, the mobile phone 1 determines that the three-dimensional object OB1 is selected as an operation target. The mobile phone 1 then changes a display mode, or so, of the three-dimensional object OB1 to notify the user that the three-dimensional object OB1 is selected as the operation target.

The determination as to whether the object is in contact with the three-dimensional object OB1 is made based on an actual position of the actual object in the three-dimensional space and based on a shape and a calculated position of the three-dimensional object OB1 in the three-dimensional space. The shape of the three-dimensional object OB1 is defined in the object data 24b.

The position of the actual object is calculated based on images captured by the imaging units 40a, 40b, 42a, and 42b. The position of the actual object may be calculated based on a previously registered size of the actual object and based on the size and the position of the actual object in the image. The position of the actual object may also be calculated by analyzing a plurality of images captured by different imaging units, such as, by checking the size and the position of the object in the image captured by the imaging unit 42a against the size and the position of the object in the image captured by the imaging unit 42b. The detection of the actual object such as the finger may be implemented using a known technology. When the actual object is the finger, the process may be performed by setting a position of the tip of the finger as a position of the object.

A calculated position of the three-dimensional object OB1 in the three-dimensional space is calculated based on a position of the three-dimensional object OB1 on the display surface of the touch panel 32 and an amount of "floating" (amount of "sinking") of the three-dimensional object OB1 in the three-dimensional space. The amount of floating (amount of sinking) of the three-dimensional object OB1 in the three-dimensional space may be a value determined upon display or a value calculated from a difference between positions of the three-dimensional object OB1 in an image for a right eye and in an image for a left eye, which are used to stereoscopically display the three-dimensional object OB1.

The selection as the operation target is notified by, for example, changing the whole color of the three-dimensional object OB1 or changing a color near a position, within the surface of the three-dimensional object OB1, in contact with the object. Instead of or in addition to such visual notification, a sound or a vibration may be used to perform the notification.

In this way, when the state of the actual object such as the finger in contact with the three-dimensional object OB1 is continuously detected for a longer period of time than a predetermined time, the mobile phone 1 determines that the three-dimensional object OB1 is selected as the operation target. By adding the continuous detection of the contact state for the longer period of time than the predetermined time to the condition, the user can be prevented from selecting an unintended three-dimensional object as an operation target during the process of moving the finger in order to operate another three-dimensional object.

It is assumed that after the selection of the three-dimensional object OB1 as the operation target, as illustrated at Step SA3, the user moves the finger F1 inside the three-dimensional object OB1 so as to push the three-dimensional object OB1. When the operation of moving the object inside the three-dimensional object OB1 selected as the operation target is detected, the mobile phone 1 changes the three-dimensional object OB1 according to the operation. How to change the three-dimensional object OB1 is determined based on the type of the three-dimensional object OB1 defined in the object data 24b and the rule of the change defined in association with the type in the action data 24c.

For example, it is assumed that the object data 24b defines the three-dimensional object OB1 as an elastic body and the action data 24c defines that the elastic body is deformed, when it is pushed, in its pushed direction according to the pushed amount. In this case, as illustrated at SA4, the mobile phone 1 changes the three-dimensional object OB1 as if a portion which the finger F1 has entered dents by pushing.

It is also assumed that the object data 24b defines the three-dimensional object OB1 as a rigid body and the action data 24c defines that the rigid body is moved, when it is pushed, in its pushed direction according to the pushed amount. In this case, as illustrated at Step SA5 in FIG. 7, the mobile phone 1 moves the three-dimensional object OB1 in the direction of forward movement of the finger F1 as if it is pushed by the finger F1. At Step SA5 in FIG. 7, the three-dimensional object OB1 is supported by the bottom surface B1, and therefore it is moving according to a component of the force which is applied by the rigid body, the component in a direction parallel the bottom surface B1.

In this way, when the operation of pushing the three-dimensional object OB1 is detected, the three-dimensional object OB1 is changed based on the object data 24b and the action data 24c, which enables the three-dimensional object OB1 to be variously changed according to each operation. The pushing operation is an operation used in various scenes in the real world, and therefore by detecting an operation of pushing the three-dimensional object OB1 and executing the corresponding process thereto, intuitive and user-friendly operability can be achieved.

The object used to operate the three-dimensional object is not limited to the finger, and therefore may be a hand, a foot, a stick, a tool, or so. A mode to change the three-dimensional object OB1 according to the pushing operation may follow actual physical law or may be that which is actually impossible.

When the pushed direction of the three-dimensional object is not parallel to the display surface of the touch panel 32, that is, when the moving direction of the detected object intersects the display surface of the touch panel 32 or intersects a horizontal plane parallel to the display surface thereof, the mobile phone 1 also changes the three-dimensional object according to the operation. In this way, by three-dimensionally determining the operation of pushing the three-dimensional object, various operations can be performed for the three-dimensional object. To three-dimensionally determine the operation of pushing the three-dimensional object, a plurality of imaging units are desirably prepared to capture the finger F1 or so from different directions so that an obstacle will not cause a blind spot.

Figure 8:
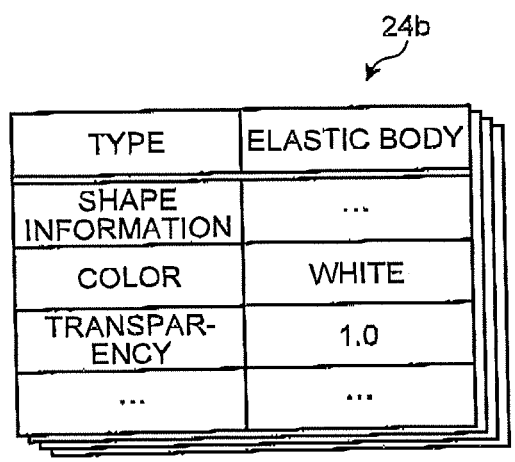
FIG. 8 is a diagram of an example of information stored in object data.

Then, the object data 24b and the action data 24c illustrated in FIG. 4 are explained in more detail below with reference to FIG. 8 to FIG. 14. FIG. 8 is a diagram of an example of information stored in the object data 24b. FIG. 9 to FIG. 14 are diagrams of examples of information stored in the action data 24c.

As illustrated in FIG. 8, the object data 24b stores therein information including type, shape information, color, transparency, and so on for each three-dimensional object. The type indicates physical characteristics of each three-dimensional object. The type is represented by a value such as "Rigid body" and "Elastic body". The shape information indicates a shape of each three-dimensional object. The shape information is, for example, a set of vertex coordinates of faces that form the three-dimensional object. The color is a surface color of each three-dimensional object. The transparency is a degree in which each three-dimensional object transmits light. The object data 24b can hold information for a plurality of three-dimensional objects.

The action data 24c stores therein information for changes made when the pushing operation is detected, for each type of three-dimensional objects. As illustrated in FIG. 9, when the type of the three-dimensional object is "Rigid body", a change made when the pushing operation is detected differs according to existence of a fulcrum, presence of an obstacle in its pushed direction, and a pushed speed. The obstacle mentioned here indicates some other three-dimensional object. Whether the pushed speed is high or low is determined based on a threshold.

When there is no fulcrum in the three-dimensional object and there is no obstacle in its pushed direction, the three-dimensional object is displayed so as to move in the pushed direction according to the pushed amount. Examples of the three-dimensional object displayed in this manner include blocks, a pen, a book, etc. As for the way to move, whether the three-dimensional object is slid or rotated may be determined based on the shape thereof. Whether the three-dimensional object is moved together with a pushing object or is moved separately from a pushing object as if it is flicked by the pushing object may be determined based on the pushed speed, or may be determined based on a calculated value or a set value of frictional resistance between the three-dimensional object and the bottom surface.

When there is no fulcrum in the three-dimensional object and there is a fixed obstacle in its pushed direction, then the three-dimensional object is displayed so as to move in the pushed direction according to the pushed amount and to stop the movement when it comes in contact with the obstacle. Examples of the three-dimensional object displayed in this manner include blocks, a pen, a book, etc. When the pushed speed is high, the three-dimensional object may break the obstacle and continue to move. When the three-dimensional object comes in contact with an obstacle while moving away from a pushing object as if it is flicked by the pushing object, the three-dimensional object may be moved in an opposite direction as if it has bounced off the obstacle.

When there is no fulcrum in the three-dimensional object, there is any other rigid body which is not fixed in its pushed direction, and the pushed speed is low, then the three-dimensional object is displayed so as to move in the pushed direction according to the pushed amount and to move together with the any other rigid body after the three-dimensional object comes in contact with the any other rigid body. When there is no fulcrum in the three-dimensional object, there is any other rigid body which is not fixed in its pushed direction, and the pushed speed is high, then the three-dimensional object is displayed so as to move in the pushed direction according to the pushed amount. After the three-dimensional object comes in contact with the any other rigid body, the rigid body is displayed so as to move as if it is flicked by the three-dimensional object. After coming in contact with any other rigid body, the three-dimensional object may be stopped in that spot, or may be continue to move with the speed being slowed down. Examples of the combination of the three-dimensional object and the any other rigid body displayed in this manner include a combination of a ball and a pin of bowling, a combination of marbles, etc.

When there is no fulcrum in the three-dimensional object, there is any other rigid body which is not fixed in its pushed direction, and the three-dimensional object can pass through the any other rigid body, then the three-dimensional object is displayed so as to move in the pushed direction according to the pushed amount and to pass through the any other rigid body even after the three-dimensional object comes in contact with the any other rigid body and to continuously move as it is. In reality, a rigid body is impossible to pass through any other rigid body; however, by enabling such a pass-through, fresh experience can be provided to the user. Examples of the combination of the three-dimensional object and the any other rigid body displayed in this manner include a combination of a ball and a pin of bowling, a combination of marbles, etc. It may be set that the three-dimensional object does not pass through any other rigid body when a threshold is provided with respect to the pushed speed and the pushed speed is slower than the threshold.

When there is a fulcrum in the three-dimensional object, the three-dimensional object is displayed so as to rotate around the fulcrum according to pushed direction and amount. The rotation mentioned here may be continuous rotation through 360 degrees or may be a reciprocating swing motion within a predetermined turning range. Examples of the three-dimensional object displayed in this manner include a pendulum, a sand bag for boxing, a windmill, etc.

As illustrated in FIG. 10, when the type of the three-dimensional object is "Elastic body", a change made when a pushing operation is detected differs according to a material, existence of limitation to its change amount, and a pushed speed. The material mentioned here is an assumed material of the three-dimensional object, which is defined in the object data 24b.

When the material of the three-dimensional object is a rubber-based material without limitation to its change amount and the pushed speed is low, the three-dimensional object is displayed so as to deform in its pushed direction according to the pushed amount and to return to its original shape when it is released from the pushed state. When the material of the three-dimensional object is a rubber-based material without limitation to its change amount and the pushed speed is high, the three-dimensional object is displayed so as to deform in its pushed direction according to the pushed amount. Thereafter, the three-dimensional object is displayed as if it is flicked to move in the pushed direction while returning to its original shape. Examples of the three-dimensional object displayed in this manner include a rubber ball, a rubber eraser, etc.

When the material of the three-dimensional object is a rubber-based material with limitation to the change amount, the three-dimensional object is displayed so as to deform in the pushed direction within a deformable range according to the pushed amount. Then, when the further pushing operation is detected, the three-dimensional object is displayed so as to move in the pushed direction while returning to its original shape. Examples of the three-dimensional object displayed in this manner include a rubber ball, a rubber eraser, etc.

When the material of the three-dimensional object is a metal-based material, the three-dimensional object is displayed so that it is deformed within a deformable range in its pushed direction according to the pushed amount. Then, when it is released from the pushed state, the three-dimensional object is displayed so that returning to its original shape and deformation are repeated (vibrated). If the three-dimensional object is pushed in any direction other than the deformable direction, the three-dimensional object moves in a similar manner to the rigid body. Examples of the three-dimensional object displayed in this manner include a plate spring, a helical spring, etc.

As illustrated in FIG. 11, when the type of the three-dimensional object is "Plastic body", the three-dimensional object is displayed so that its pushed portion dents and the entire shape is thereby deformed. Examples of the three-dimensional object displayed in this manner include clay, etc.

As illustrated in FIG. 12, when the type of the three-dimensional object is "Liquid", a change made when a pushing operation is detected differs according to a pushed speed. When the pushed speed is low, the pushing object is displayed so as to be soaked in the three-dimensional object, that is, in the liquid. When the pushed speed is medium, the pushing object is displayed so that it is soaked in the liquid with ripples spreading across the liquid. When the pushed speed is high, the pushing object is displayed so that it is soaked in the liquid with water splashes from the liquid. Examples of the three-dimensional object displayed in this manner include water in a glass, etc.

As illustrated in FIG. 13, when the type of the three-dimensional object is "Gas", a change made when a pushing operation is detected differs according to a pushed speed. When the pushed speed is low, the three-dimensional object, that is, the gas is displayed so that it is blocked by the pushing object to float around the periphery thereof. When the pushed speed is medium, the gas is displayed so as to be scattered by the pushing object. When the pushed speed is high, the gas is displayed so that eddy is produced in the gas due to turbulent flow in the back side of the pushing object in the moving direction. Examples of the three-dimensional object displayed in this manner include smoke, etc.

As illustrated in FIG. 14, when the type of the three-dimensional object is "Aggregation", a change made when a pushing operation is detected differs according to how elements of the aggregation are combined. When the elements of the aggregation are not combined, the three-dimensional object is displayed so that its pushed portion dents and the entire shape as the aggregation is thereby changed. Examples of the three-dimensional object displayed in this manner include sands, sugar, etc.

When the elements of the aggregation are combined, the three-dimensional object is displayed so that its pushed portion dents and the entire shape as the aggregation is thereby changed. Moreover, it may be displayed so that any elements other than the pushed portion are pulled by the elements of the pushed portion to move. Examples of the three-dimensional object displayed in this manner include a chain, etc.

When the elements of the aggregation are not combined but attractive force or repulsive force acts between the elements and a pushing object, the three-dimensional object is displayed so as to move without contacting the pushing object. When the attractive force acts between the elements and the pushing object, the three-dimensional object is attracted to the pushing object without contacting the pushing object when it enters within a predetermined distance to the pushing object. When the repulsive force acts between the elements and the pushing object, the three-dimensional object is repelled from the pushing object without contacting the pushing object when it enters within a predetermined distance to the pushing object. Examples of the combination of the three-dimensional object and the pushing object displayed in this manner include a combination of iron powder and a magnet, etc. In this case, the finger, for example, may be used as a magnet.

In this way, by changing the three-dimensional object based on the information stored in the object data 24b and the information stored in the action data 24c, the three-dimensional object can be variously changed according to the pushing operation. The information stored in the object data 24b and in the action data 24c is not limited to the examples, and therefore may be appropriately varied depending on intended use or so. For example, settings may be made so that the way to change the three-dimensional object is switched according to the type and/or the size of the pushing object, the size of a contact area between the pushing object and the three-dimensional object, etc.

Then, a procedure for an operation of pushing the three-dimensional object executed by the mobile phone 1 is explained with reference to FIG. 15 and FIG. 16. FIG. 15 is a flowchart of a procedure of the contact detecting process of the three-dimensional object according to the first embodiment. The procedure illustrated in FIG. 15 is implemented by the control unit 22 executing the control program 24a triggered by detection of a predetermined operation or the like.

As illustrated in FIG. 15, first of all, at Step S101, the control unit 22 stereoscopically displays a three-dimensional object based on the object data 24b. The object data 24b may be previously stored in the storage unit 24 or may be acquired from any other device such as a server through communication performed by the communication unit 26.

Subsequently, at Step S102, the control unit 22 determines whether detectors, that is, the imaging units 40a and 40b or the imaging units 42a and 42b have detected a predetermined object. The predetermined object is, for example, a user's finger. When the predetermined object has not been detected (No at Step S102), then at Step S108, the control unit 22 determines whether operation completion has been detected.

For example, the operation completion may be detected when a predetermined operation is performed for the operating unit 13, or may be detected when a predetermined operation is performed for the touch panel 32. The operation completion may also be detected when a predetermined user's hand gesture is captured by at least one of the imaging units 40a, 40b, 42a, and 42b. When the operation completion has been detected (Yes at Step S108), the control unit 22 ends the contact detecting process. When the operation completion has not been detected (No at Step S108), the control unit 22 re-executes Step S102 and the subsequent steps.

When the predetermined object has been detected (Yes at Step S102), then at Step S103, the control unit 22 determines the type of the predetermined object. The type of the predetermined object is determined based on the size, the shape, the color, and so on of the object in images captured by the imaging units 40a and 40b or by the imaging units 42a and 42b. Subsequently, at Step S104, the control unit 22 looks for a three-dimensional object in contact with the predetermined object.

When there is no three-dimensional object in contact with the predetermined object (No at Step S105), then at Step S108, the control unit 22 determines whether the operation completion has been detected. When the operation completion has been detected (Yes at Step S108), the control unit 22 ends the contact detecting process. When the operation completion has not been detected (No at Step S108), the control unit 22 re-executes Step S102 and the subsequent steps.

When the three-dimensional object in contact with the predetermined object has been found (Yes at Step S105), then at Step S106, the control unit 22 determines the type of the three-dimensional object in contact with the predetermined object based on the object data 24b. Then at Step S107, the control unit 22 executes an operation detecting process explained later. Thereafter, at Step S108, the control unit 22 determines whether the operation completion has been detected. When the operation completion has been detected (Yes at Step S108), the control unit 22 ends the contact detecting process. When the operation completion has not been detected (No at Step, S108), the control unit 22 re-executes Step S102 and the subsequent steps.

Figure 16:
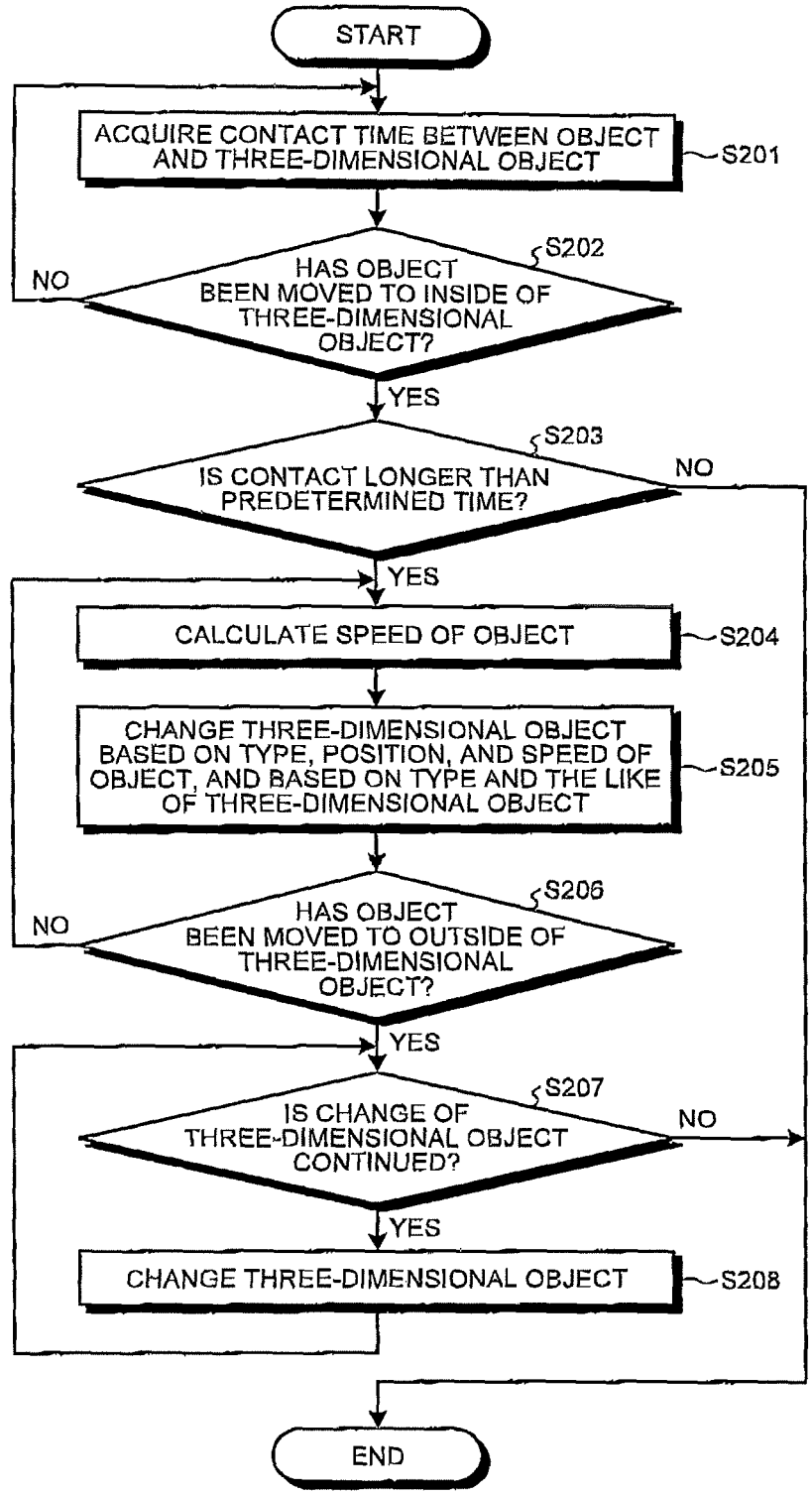
FIG. 16 is a flowchart of a procedure of an operation detecting process according to the first embodiment.

FIG. 16 is a flowchart of a procedure of the operation detecting process according to the first embodiment. The procedure illustrated in FIG. 16 is implemented by the control unit 22 executing the control program 24a.

As illustrated in FIG. 16, first of all, at Step S201, the control unit 22 acquires a contact time between the predetermined object and the three-dimensional object. Then at Step S202, the control unit 22 determines whether the predetermined object has been moved to the inside of the three-dimensional object. When the predetermined object has not been moved to the inside of the three-dimensional object (No at Step S202), the control unit 22 re-executes Step S201 and the subsequent step.

When the predetermined object has been moved to the inside of the three-dimensional object (Yes at Step S202), then at Step S203, the control unit 22 determines whether the contact time is longer than the predetermined time. When the contact time is not longer than the predetermined time (No at Step S203), it is determined that the three-dimensional object is not the operation target, and therefore the control unit 22 ends the operation detecting process.

When the contact time is longer than the predetermined time (Yes at Step S203), then at Step S204, the control unit 22 calculates a speed of the predetermined object. At Step S205, the control unit changes the three-dimensional object based on the type, the position, and the speed of the predetermined object and based on the type and the like of the three-dimensional object. A specific way to change the three-dimensional object is determined according to the action data 24c.

Subsequently, at Step S206, the control unit 22 determines whether the predetermined object has been moved to the outside of the three-dimensional object. When the predetermined object has not been moved to the outside of the three-dimensional object, that is, when the pushing operation is continued (No at Step S206), the control unit 22 re-executes Step S204 and the subsequent steps.

When the predetermined object has been moved to the outside of the three-dimensional object, that is, when the three-dimensional object has been released (Yes at Step S206), then at Step S207, the control unit 22 determines whether the change of the three-dimensional object is continued. For example, when it is defined in the action data 24c that the vibration is continued for a predetermined time even after the release, the control unit 22 determines that the change of the three-dimensional object is continued.

When the change of the three-dimensional object is continued (Yes at Step S207), then at Step S208, the control unit 22 changes the three-dimensional object, and thereafter re-executes Step S207 and the subsequent step. When the change of the three-dimensional object is not continued (No at Step S207), the control unit 22 ends the operation detecting process.

As explained above, in the first embodiment, the touch panel 32 is made transparent, and therefore the user can operate the three-dimensional object on the back face side of the touch panel 32 without blocking the three-dimensional object displayed by the touch panel 32. The first embodiment is configured to variously change the three-dimensional object according to the pushing operation, thus providing a user-friendly operation method to users.

A second embodiment is explained below. The mobile phone 1 according to the second embodiment is different in a procedure of the operation detecting process executed based on the functions provided by the control program 24a from that according to the first embodiment. However, it is configured in the same manner as the mobile phone 1 according to the first embodiment in terms of the hardware. Therefore, in the second embodiment, explanation that overlaps with the explanation in the first embodiment is omitted, and the operation detecting process is mainly explained below.

Figure 17:
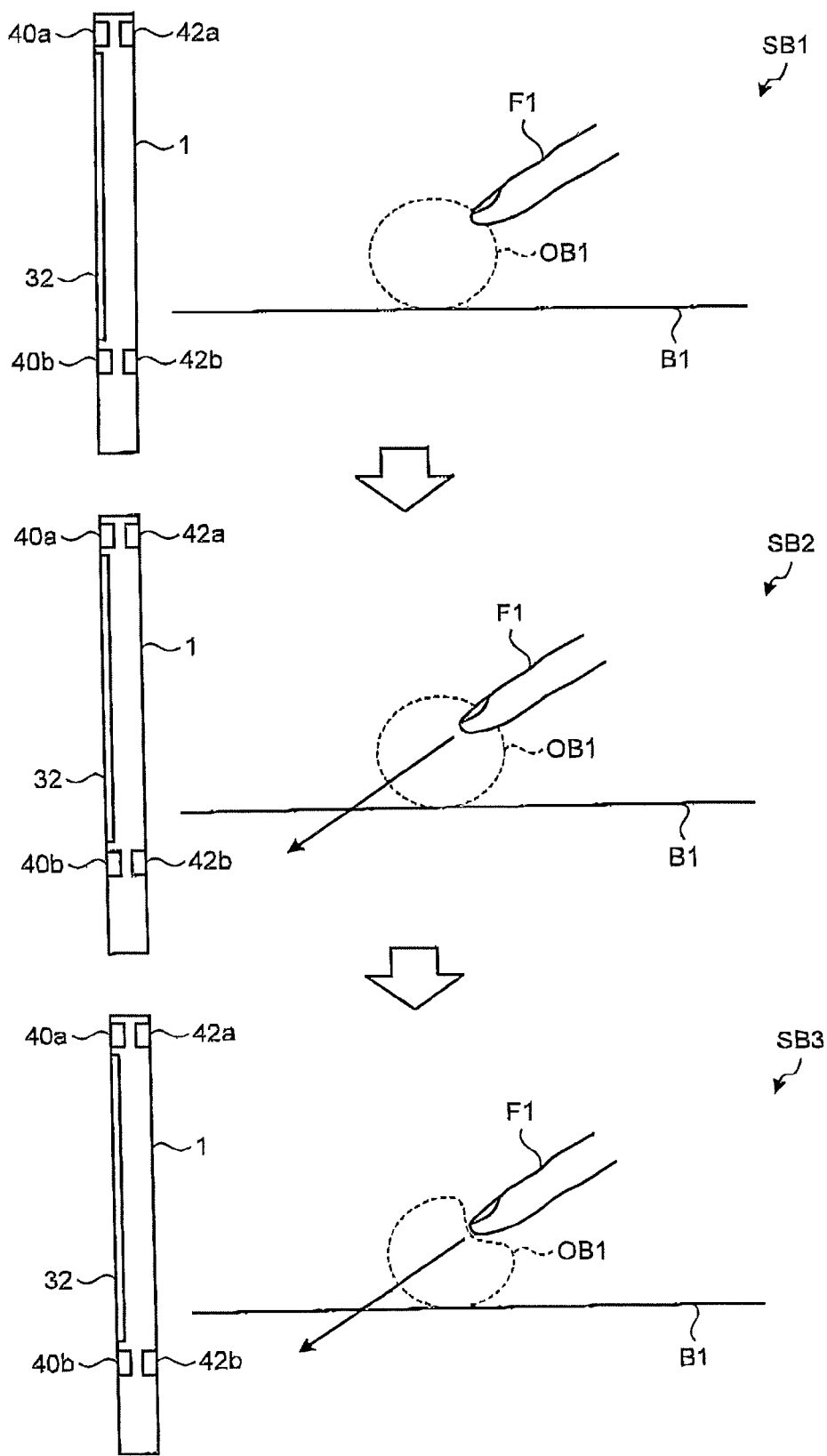
FIG. 17 is a diagram for explaining detection of an operation of pushing a three-dimensional object and changes of the three-dimensional object according to the detected operation in a second embodiment.

First of all, detection of an operation of pushing a three-dimensional object and a change of the three-dimensional object according to the detected operation are explained with reference to FIG. 17. FIG. 17 is a diagram for explaining detection of an operation of pushing the three-dimensional object and changes of the three-dimensional object according to the detected operation. At Step SB1 in FIG. 17, the user brings the finger F1 into contact with the three-dimensional object OB1, and at Step SB2, the user moves the finger F1 inside the three-dimensional object OB1.

When an actual object has been detected in the three-dimensional space and the state in which the object comes in contact with the three-dimensional object OB1 and then moves to the inside of the three-dimensional object is continued for the longer period of time than the predetermined time, then the mobile phone 1 determines that the three-dimensional object OB1 has been selected as the operation target. The mobile phone 1 then changes the display mode, or so, of the three-dimensional object OB1 to notify the user that the three-dimensional object OB1 has been selected as the operation target. Moreover, as illustrated at Step SB3, the mobile phone 1 changes the three-dimensional object OB1 according to the operation by the finger F1 after the detection of the contact as if it has already been selected as a target of the pushing operation at the stage of Step SB1.

In this way, it is configured that the pushing operation can be detected after the contact between the object and the three-dimensional object is detected even if the object does not remain in that spot, and therefore the user can quickly start the operation of pushing the three-dimensional object. By adding the state, in which the object after the contact moves to the inside of the three-dimensional object OB1 continues for the longer period of time than the predetermined time, to the condition, the user can be prevented from selecting an unintended three-dimensional object as an operation target during the process of moving the finger in order to operate any other three-dimensional object.

Figure 18:
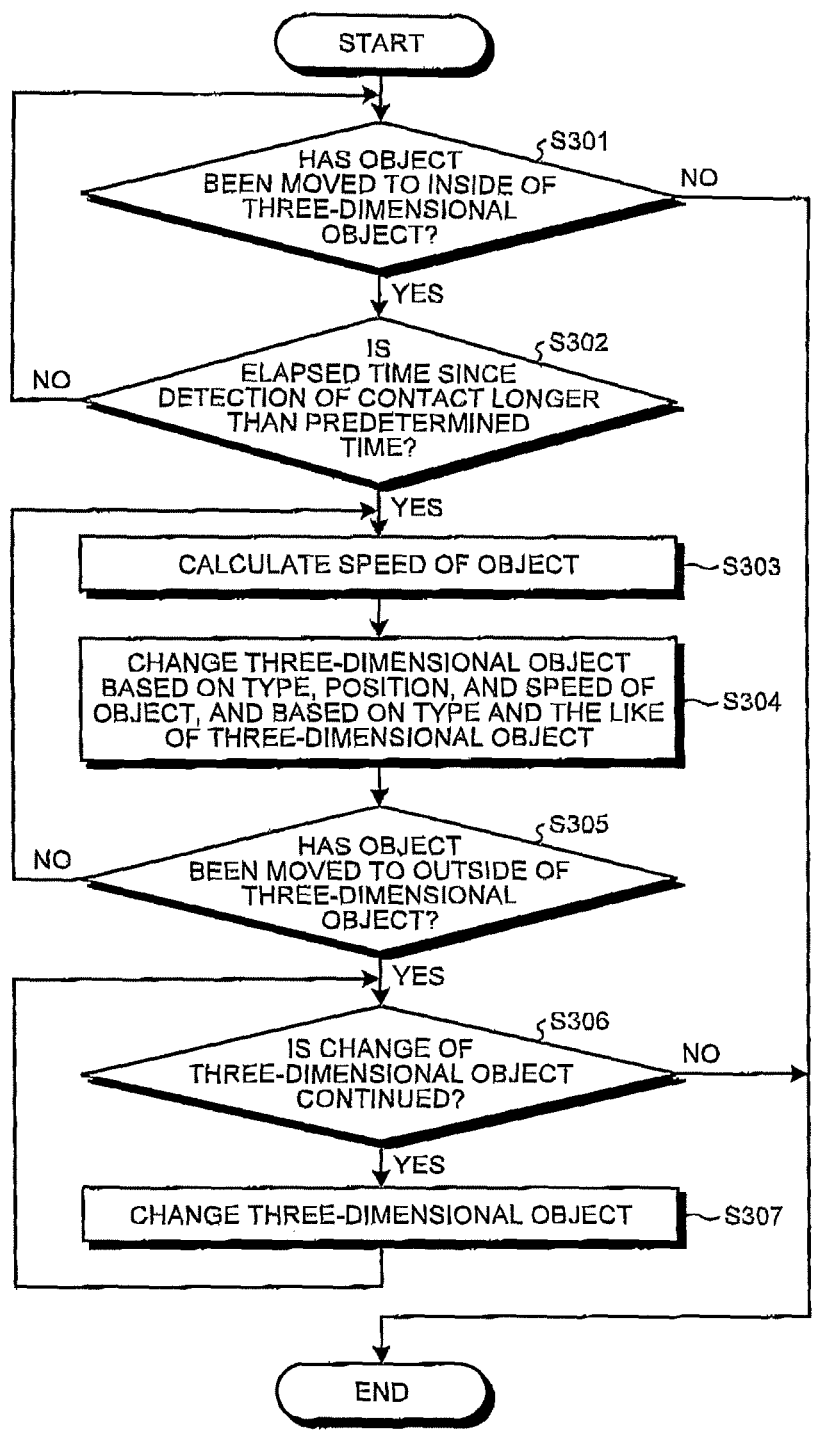
FIG. 18 is a flowchart of a procedure of an operation detecting process according to the second embodiment.

Then, a procedure of the operation detecting process according to the second embodiment is explained below with reference to FIG. 18. FIG. 18 is a flowchart of the procedure of the operation detecting process according to the second embodiment. The procedure illustrated in FIG. 18 is implemented by the control unit 22 executing the control program 24a. The procedure of the contact detecting process is the same as that illustrated in FIG. 15.

As illustrated in FIG. 18, first of all, at Step S301, the control unit 22 determines whether the predetermined object has been moved to the inside of the three-dimensional object. When the predetermined object has not been moved to the inside of the three-dimensional object (No at Step S301), it is determined that the three-dimensional object is not the operation target, and therefore the control unit 22 ends the operation detecting process.

When the predetermined object has been moved to the inside of the three-dimensional object (Yes at Step S301), then at Step S302, the control unit 22 determines whether an elapsed time since the detection of the contact is longer than a predetermined time. When the elapsed time is not longer than the predetermined time (No at Step S302), the control unit 22 re-executes Step S301 and the subsequent step.

When the elapsed time is longer than the predetermined time (Yes at Step S302), then at Step S303, the control unit 22 calculates a speed of the predetermined object. At Step S304, the control unit 22 changes the three-dimensional object based on the type, the position, and the speed of the predetermined object and based on the type and the like of the three-dimensional object. A specific way to change the three-dimensional object is determined according to the action data 24c.

Subsequently, at Step S305, the control unit 22 determines whether the predetermined object has been moved to the outside of the three-dimensional object. When the predetermined object has not been moved to the outside of the three-dimensional object, that is, when the pushing operation is continued (No at Step S305), the control unit 22 re-executes Step S303 and the subsequent steps.

When the predetermined object has been moved to the outside of the three-dimensional object, that is, when the three-dimensional object has been released (Yes at Step S305), then at Step S306, the control unit 22 determines whether the change of the three-dimensional object is continued. For example, when it is defined in the action data 24c that the vibration is continued for a predetermined time even after the release, the control unit 22 determines that the change of the three-dimensional object is continued.

When the change of the three-dimensional object is continued (Yes at Step S306), then at Step S307, the control unit 22 changes the three-dimensional object, and thereafter re-executes Step S306 and the subsequent step. When the change of the three-dimensional object is not continued (No at Step S306), the control unit 22 ends the operation detecting process.

As explained above, according to the second embodiment, the mobile phone 1 is configured to recognize the pushing operation even when the state in which the object such as the finger is in contact with the three-dimensional object does not continue for a longer period of time than a predetermined time, and therefore the user can quickly start the operation of pushing the three-dimensional object.

A third embodiment is explained below. The mobile phone 1 according to the third embodiment is different in a procedure of the operation detecting process executed based on the functions provided by the control program 24a from that according to the first embodiment. However, it is configured in the same manner as the mobile phone 1 according to the first embodiment in terms of the hardware. Therefore, in the third embodiment, explanation that overlaps with the explanation in the first embodiment is omitted, and the operation detecting process is mainly explained below.

Figure 19:
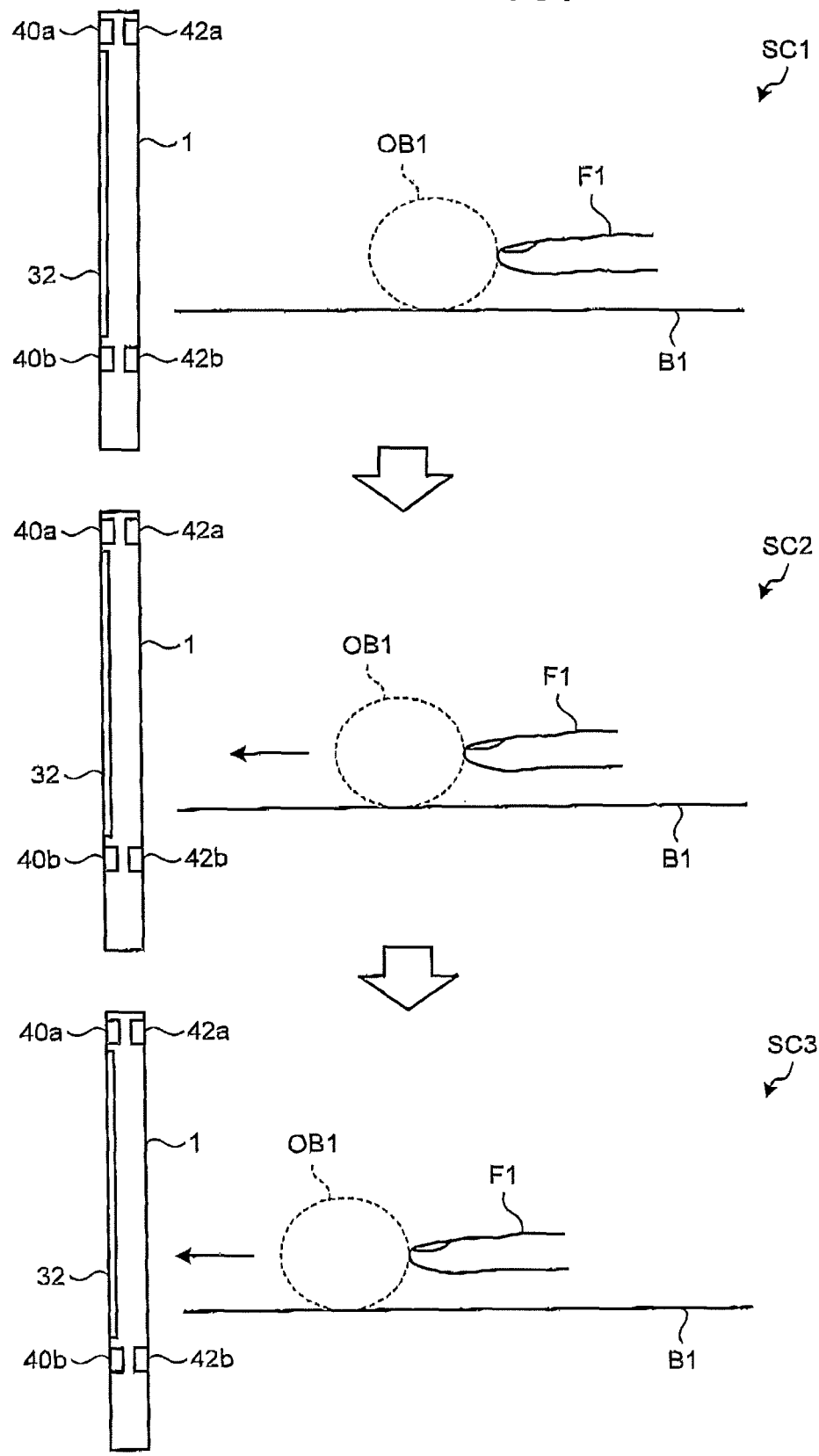
FIG. 19 is a diagram for explaining detection of an operation of pushing a three-dimensional object and changes of the three-dimensional object according to the detected operation in a third embodiment.
Figure 20:
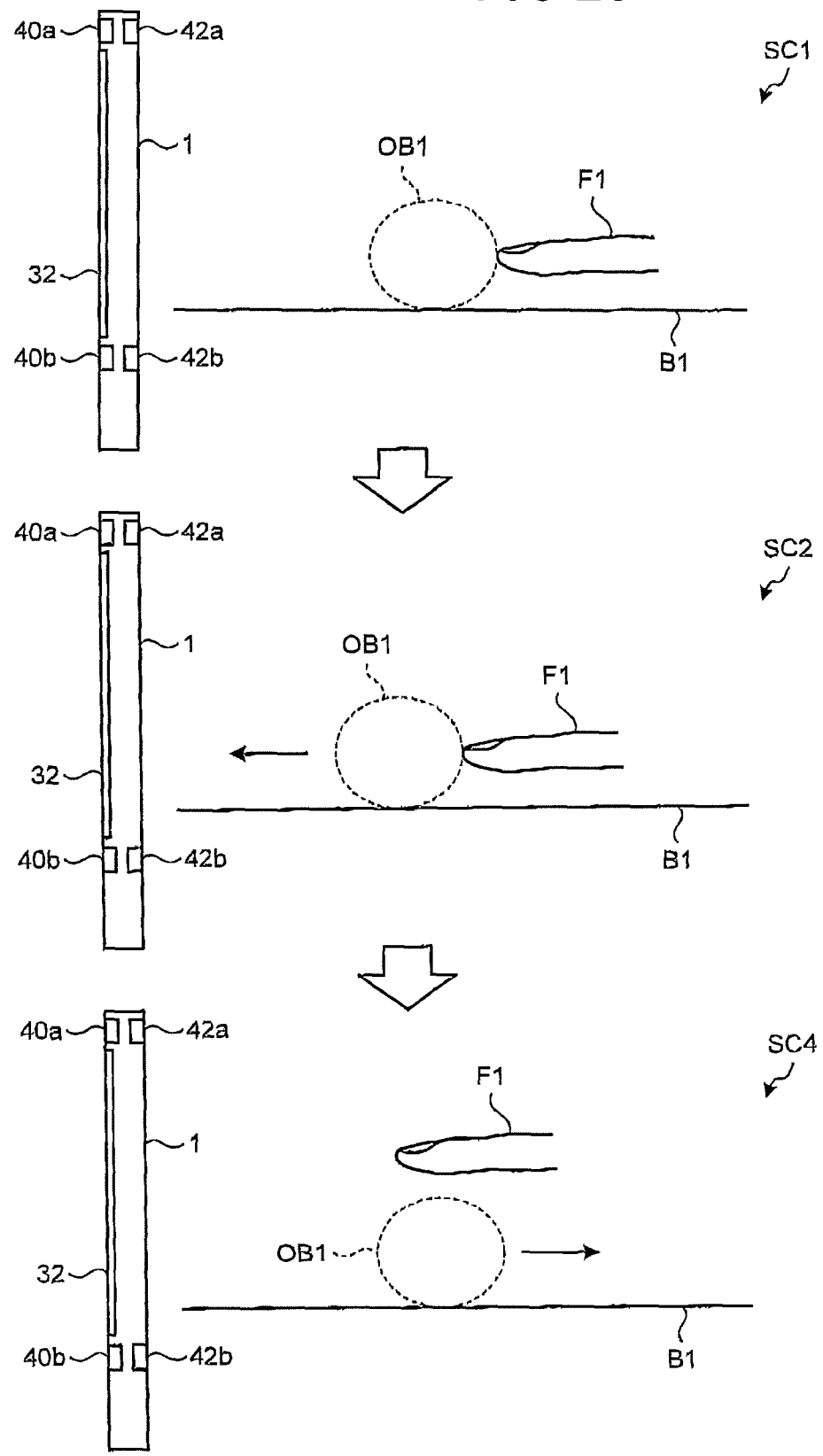
FIG. 20 is a diagram for explaining detection of an operation of pushing the three-dimensional object and changes of the three-dimensional object according to the detected operation in the third embodiment.

First of all, detection of an operation of pushing a three-dimensional object and a change of the three-dimensional object according to the detected operation are explained with reference to FIG. 19 and FIG. 20. FIG. 19 and FIG. 20 are diagrams for explaining detection of an operation of pushing the three-dimensional object and changes of the three-dimensional object according to the detected operation. At Step SC1 in FIG. 19, the touch panel 32 stereoscopically displays the three-dimensional object OB1 in the three-dimensional space. The user brings the finger F1 into contact with the three-dimensional object OB1.

It is assumed that the user moves the finger F1 inside the three-dimensional object OB1. When it is detected that the object in contact with the three-dimensional object OB1 is moved to the inside of the three-dimensional object OB1, then, as illustrated at Step SC2, the mobile phone 1 changes the three-dimensional object OB1, from that point on, according to the operation by the finger F1. In the example of FIG. 19, at Step SC2, the three-dimensional object OB1 starts moving together with the movement of the finger F1.

Then, as illustrated at Step SC3, at the stage when the movement of the finger F1 to the inside of the three-dimensional object OB1 has been continued for the longer period of time than the predetermined time, the mobile phone 1 determines that the three-dimensional object OB1 has been as the operation target. The mobile phone 1 then changes the display mode, or so, of the three-dimensional object OB1 to notify the user that the three-dimensional object OB1 has been determined as the operation target. Thereafter, the mobile phone 1 continues changing the three-dimensional object OB1 while the movement of the finger F1 to the inside of the three-dimensional object OB1 is detected.

As illustrated at Step SC4 in FIG. 20, when the movement of the finger F1 to the inside of the three-dimensional object OB1 becomes undetectable before the predetermined time elapses, the mobile phone 1 makes a reverse change to the change made so far, to the three-dimensional object OB1. Consequently, the three-dimensional object OB1 is displayed at the same position as that at the stage of Step SC1 in the same state. The speed at which the reverse change is made to the three-dimensional object OB1 may be higher than the speed at which the change is made to the three-dimensional object OB1 so far. Namely, the three-dimensional object OB1 may be reversely changed as if it is reversely reproduced at a high speed.

In this way, by starting making the change to the three-dimensional object from the stage when the entry of the object to the inside of the three-dimensional object is detected, the user can recognize that the three-dimensional object is being selected before the selection is determined. As a result, the user is able to know, at an early point, whether an intended three-dimensional object is selected. When an unintended three-dimensional object is being selected, the user can return the three-dimensional object which is unintentionally being selected to its original state by stopping the operation before the predetermined time elapses.

Until the movement of the finger F1 to the inside of the three-dimensional object OB1 is continued for the longer period of time than the predetermined time, the three-dimensional object with the change being made thereto may be displayed in a mode (e.g., half-transparent mode) different from the normal mode or from the mode in which the selection has been determined as the operation target. By changing the display mode in this manner, the user can easily determine the state of the three-dimensional object.

Figure 21:
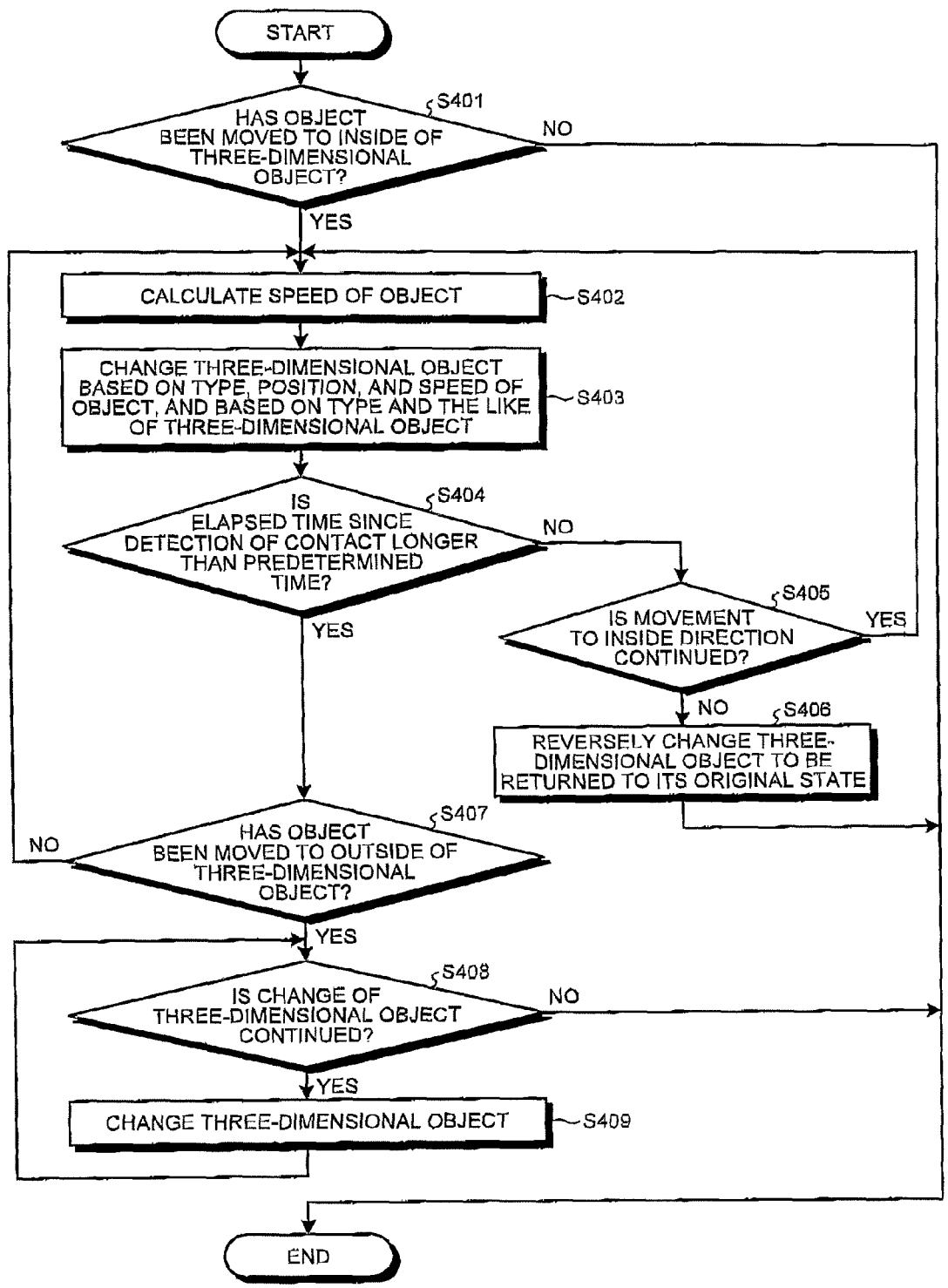
FIG. 21 is a flowchart of a procedure of an operation detecting process according to the third embodiment.

Then, a procedure of the operation detecting process according to the third embodiment is explained below with reference to FIG. 21. FIG. 21 is a flowchart of the procedure of the operation detecting process according to the third embodiment. The procedure illustrated in FIG. 21 is implemented by the control unit 22 executing the control program 24a. The procedure of the contact detecting process is the same as that illustrated in FIG. 15.

As illustrated in FIG. 21, first of all, at Step S401, the control unit 22 determines whether the predetermined object has been moved to the inside of the three-dimensional object. When the predetermined object has not been moved to the inside of the three-dimensional object (No at Step S401), it is determined that the three-dimensional object is not the operation target, and therefore the control unit 22 ends the operation detecting process.

When the predetermined object has been moved to the inside of the three-dimensional object (Yes at Step S401), then at Step S402, the control unit 22 calculates a speed of the predetermined object. At Step S403, the control unit changes the three-dimensional object based on the type, the position, and the speed of the predetermined object and based on the type and the like of the three-dimensional object. A specific way to change the three-dimensional object is determined according to the action data 24c.

Subsequently, at Step S404, the control unit 22 determines whether an elapsed time since the detection of the contact is longer than a predetermined time. When the elapsed time is not longer than the predetermined time, that is, when the three-dimensional object is not determined as a target of the pushing operation (No at Step S404), then at Step S405, the control unit 22 determines whether the movement of the predetermined object to the inside direction of the three-dimensional object is continued.

When the movement of the predetermined object to the inside direction of the three-dimensional object is continued (Yes at Step S405), the control unit 22 re-executes Step S402 and the subsequent steps. When the movement of the predetermined object to the inside direction of the three-dimensional object is not continued (No at Step S405), then at Step S406, the control unit 22 reversely changes the three-dimensional object OB1 to be returned to its original state. The control unit 22 then ends the operation detecting process.

When the elapsed time since the detection of the contact is longer than the predetermined time (Yes at Step S404), then at Step S407, the control unit 22 determines whether the predetermined object has been moved to the outside of the three-dimensional object. When the predetermined object has not been moved to the outside of the three-dimensional object, that is, when the pushing operation is continued (No at Step S407), the control unit 22 re-executes Step S402 and the subsequent steps.

When the predetermined object has been moved to the outside of the three-dimensional object, that is, when the three-dimensional object has been released (Yes at Step S407), then at Step S408, the control unit 22 determines whether the change of the three-dimensional object is continued. For example, when it is defined in the action data 24c that the vibration is continued for a predetermined time even after the release, it is determined that the change of the three-dimensional object is continued.

When the change of the three-dimensional object is continued (Yes at Step S408), then at Step S409, the control unit 22 changes the three-dimensional object, and thereafter re-executes Step S408 and the subsequent step. When the change of the three-dimensional object is not continued (No at Step S408), the control unit 22 ends the operation detecting process.

As explained above, according to the third embodiment, the mobile phone 1 is configured to change the three-dimensional object according to the operation from the time when the pushing operation is detected, and therefore the user can easily recognize the three-dimensional object determined as a target of the pushing operation.

A fourth embodiment is explained below. The third embodiment has explained the operation of pushing the three-dimensional object; however, the fourth embodiment will explain an operation performed with a three-dimensional object pinched. The mobile phone 1 according to the fourth embodiment is configured in the same manner as the mobile phone 1 according to the first embodiment in terms of the hardware. Therefore, in the fourth embodiment, explanation that overlaps with the explanation in the first embodiment is omitted.

Figure 22:
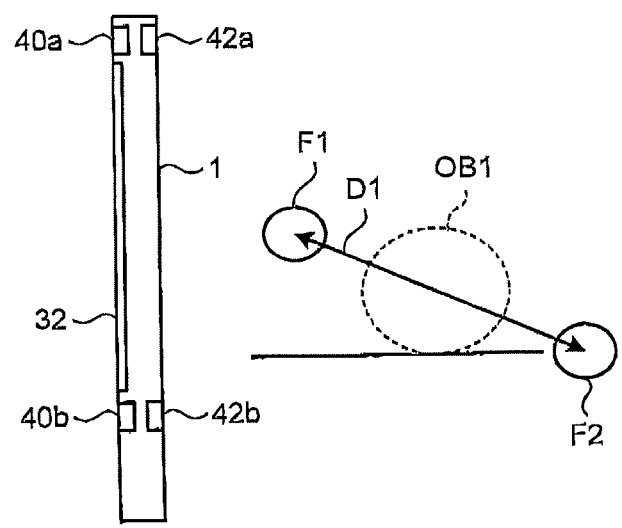
FIG. 22 is a diagram for explaining detection of an operation performed with the three-dimensional object pinched.

First of all, detection of an operation performed with a three-dimensional object pinched is explained with reference to FIG. 22. FIG. 22 is a diagram for explaining detection of an operation performed with a three-dimensional object pinched. As illustrated in FIG. 22, the touch panel 32 stereoscopically displays a three-dimensional object OB1 in a three-dimensional space on the back face side.

It is assumed that the user wishes to perform an operation with the three-dimensional object OB1 pinched. To perform the operation with the three-dimensional object OB1 pinched, first of all, the three-dimensional object OB1 has to be selected as an operation target. To select the three-dimensional object OB1, as illustrated in FIG. 22, the user moves the finger F1 and a finger F2 so that the three-dimensional object OB1 is located between the finger F1 and the finger F2, and maintains this state for a longer period of time than a predetermined time.

When two objects are detected within the three-dimensional space and the state of the three-dimensional object OB1 located between the two objects continues for the longer period of time than the predetermined time, the mobile phone 1 determines that the three-dimensional object OB1 is selected, and sets the three-dimensional object OB1 to be in a selected state. The mobile phone 1 then changes the display mode, or so, of the three-dimensional object OB1 to notify the user that the three-dimensional object OB1 is in the selected state.

The determination as to whether the three-dimensional object OB1 is located between the two objects is performed based on actual positions of the two objects in the three-dimensional space and based on a shape and a calculated position of the three-dimensional object OB1 in the three-dimensional space. The three-dimensional object OB1 set in the selected state is notified by, for example, changing the whole color of the three-dimensional object OB1 or changing a color near a position, within the surface of the three-dimensional object OB1, intersecting a line connecting the two objects. Instead of or in addition to such visual notification, a sound and/or a vibration may be used to perform the notification.

In this way, when the state where the three-dimensional object OB1 is located between the actual objects such as the fingers is continuously detected for a longer period of time than a predetermined time, the mobile phone 1 determines that the three-dimensional object on is selected. An operation such that the fingers are placed so as to sandwich the three-dimensional object OB1 therebetween is similar to a one's operation of pinching an object in order to select an actual object. Therefore, such an operation is intuitive and easy to understand as an operation for selecting the three-dimensional object. Moreover, by adding the continuous detection of the state for the longer period of time than the predetermined time to the condition, the user can be prevented from selecting an unintended three-dimensional object during the process of moving the fingers in order to select any other three-dimensional object.

The objects used to operate the three-dimensional object are not limited to the fingers, and therefore may be hands, feet, sticks, setting pins, or so. Even when the two objects are not parallel to the display surface of the touch panel 32, that is, even when the line connecting the two objects intersects the display surface of the touch panel 32 or intersects a horizontal plane parallel to the display surface thereof, the mobile phone 1 sets the three-dimensional object to be in the selected state based on the condition. In this way, the three-dimensional determination as to whether the three-dimensional object is selected makes it easy to perform the selection operation matching the shape of the three-dimensional object.

To three-dimensionally determine whether the three-dimensional object has been selected, a plurality of imaging units are desirably prepared to capture the finger F1, the finger F2, and so on from different directions so that an obstacle will not cause a blind spot.

After it is determined that the three-dimensional object OB1 is in the selected state, the mobile phone 1 makes a change such as movement, deformation, or deletion to the three-dimensional object OB1 according to the moves of the finger F1 and the finger F2.

Figure 23:
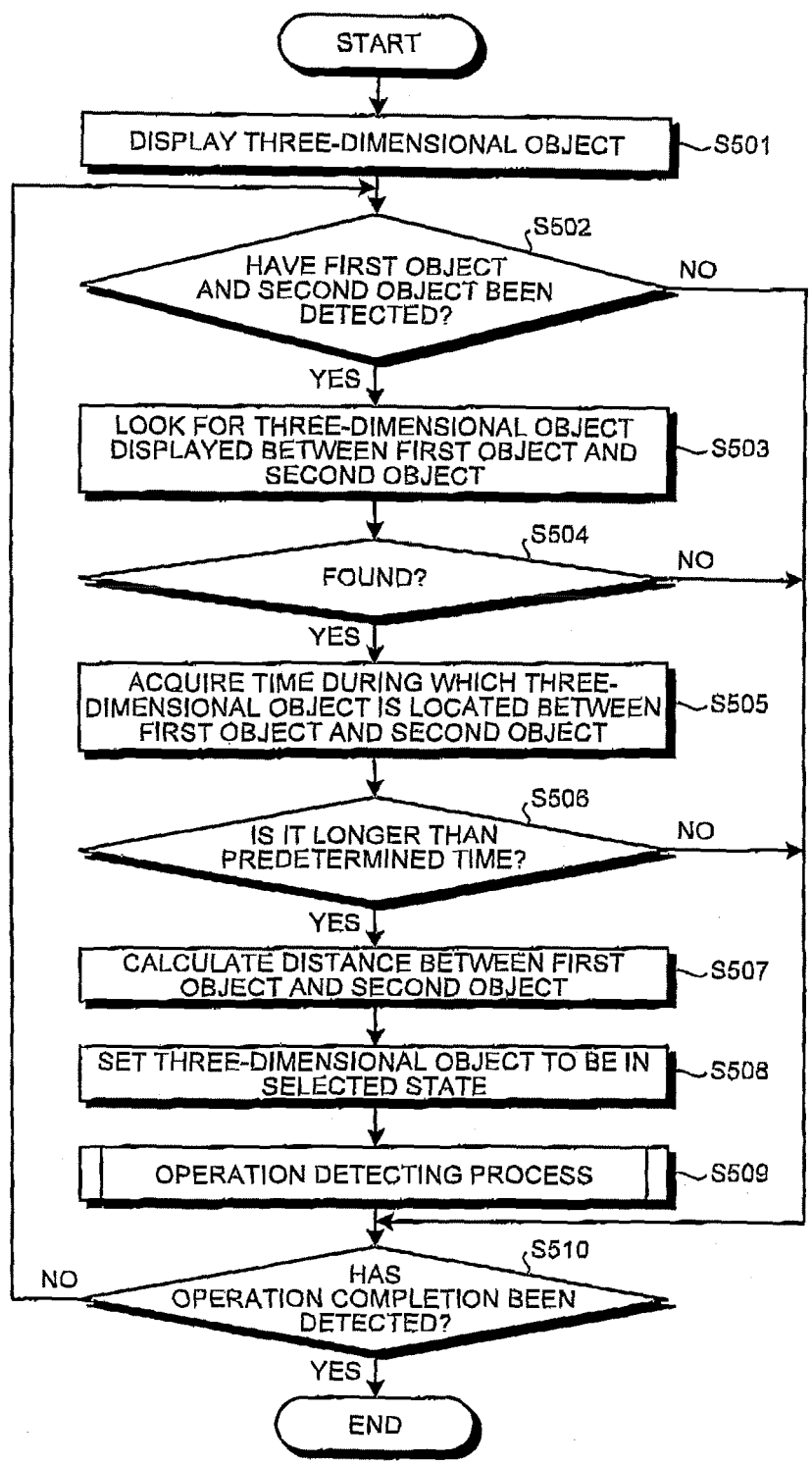
FIG. 23 is a flowchart of a procedure of a selection detecting process according to a fourth embodiment.

Then, a procedure for operations of the three-dimensional object executed by the mobile phone 1 is explained with reference to FIG. 23 and FIG. 24. FIG. 23 is a flowchart of a procedure of the selection detecting process of the three-dimensional object according to the fourth embodiment. The procedure illustrated in FIG. 23 is implemented by the control unit 22 executing the control program 24a triggered by detection of a predetermined operation or the like.

As illustrated in FIG. 23, first of all, at Step S501, the control unit 22 stereoscopically displays a three-dimensional object. The data used to display the three-dimensional object may be previously stored in the storage unit 24 or may be acquired from any other device such as a server through communication performed by the communication unit 26.

Subsequently, at Step S502, the control unit 22 determines whether detectors, that is, the imaging units 40a and 40b or the imaging units 42a and 42b have detected a first object and a second object. The first object and the second object are, for example, user's fingers. When the first object and the second object have not been detected (No at Step S502), then at Step S510, the control unit 22 determines whether operation completion has been detected.

The operation completion may be detected when a predetermined operation is performed for the operating unit 13, or may be detected when a predetermined operation is performed for the touch panel 32. The operation completion may also be detected when a predetermined user's hand gesture is captured by at least one of the imaging units 40a, 40b, 42a, and 42b. When the operation completion has been detected (Yes at Step S510), the control unit 22 ends the selection detecting process. When the operation completion has not been detected (No at Step S510), the control unit 22 re-executes Step S502 and the subsequent steps.

When the first object and the second object have been detected (Yes at Step S502), then at Step S503, the control unit 22 looks for a three-dimensional object displayed between the first object and the second object, from among displayed three-dimensional objects. When there is no corresponding three-dimensional object (No at Step S504), then at Step S510, the control unit 22 determines whether the operation completion has been detected. When the operation completion has been detected (Yes at Step S510), the control unit 22 ends the selection detecting process. When the operation completion has not been detected (No at Step S510), the control unit 22 re-executes Step S502 and the subsequent steps.

When the three-dimensional object displayed between the first object and the second object has been found (Yes at Step S504), then at Step S505, the control unit 22 acquires a time during which the three-dimensional object is located between the first object and the second object. When the acquired time is not longer than a predetermined time (No at Step S506), then at Step S510, the control unit 22 determines whether the operation completion has been detected. When the operation completion has been detected (Yes at Step S510), the control unit 22 ends the selection detecting process. When the operation completion has not been detected (No at Step S510), the control unit 22 re-executes Step S502 and the subsequent steps.

When the acquired time is longer than the predetermined time (Yes at Step S506), then at Step S507, the control unit 22 calculates a distance between the first object and the second object. At Step S508, the control unit 22 sets the three-dimensional object displayed between the first object and the second object to be in the selected state. At Step S509, the control unit 22 executes an operation detecting process explained later, and changes, during its execution, the three-dimensional object in the selected state according to the detected operation. After the completion of the operation detecting process, the control unit 22 determines at Step S510 whether the operation completion has been detected. When the operation completion has been detected (Yes at Step S510), the control unit 22 ends the selection detecting process. When the operation completion has not been detected (No at Step S510), the control unit 22 re-executes Step S502 and the subsequent steps.

Figure 24:
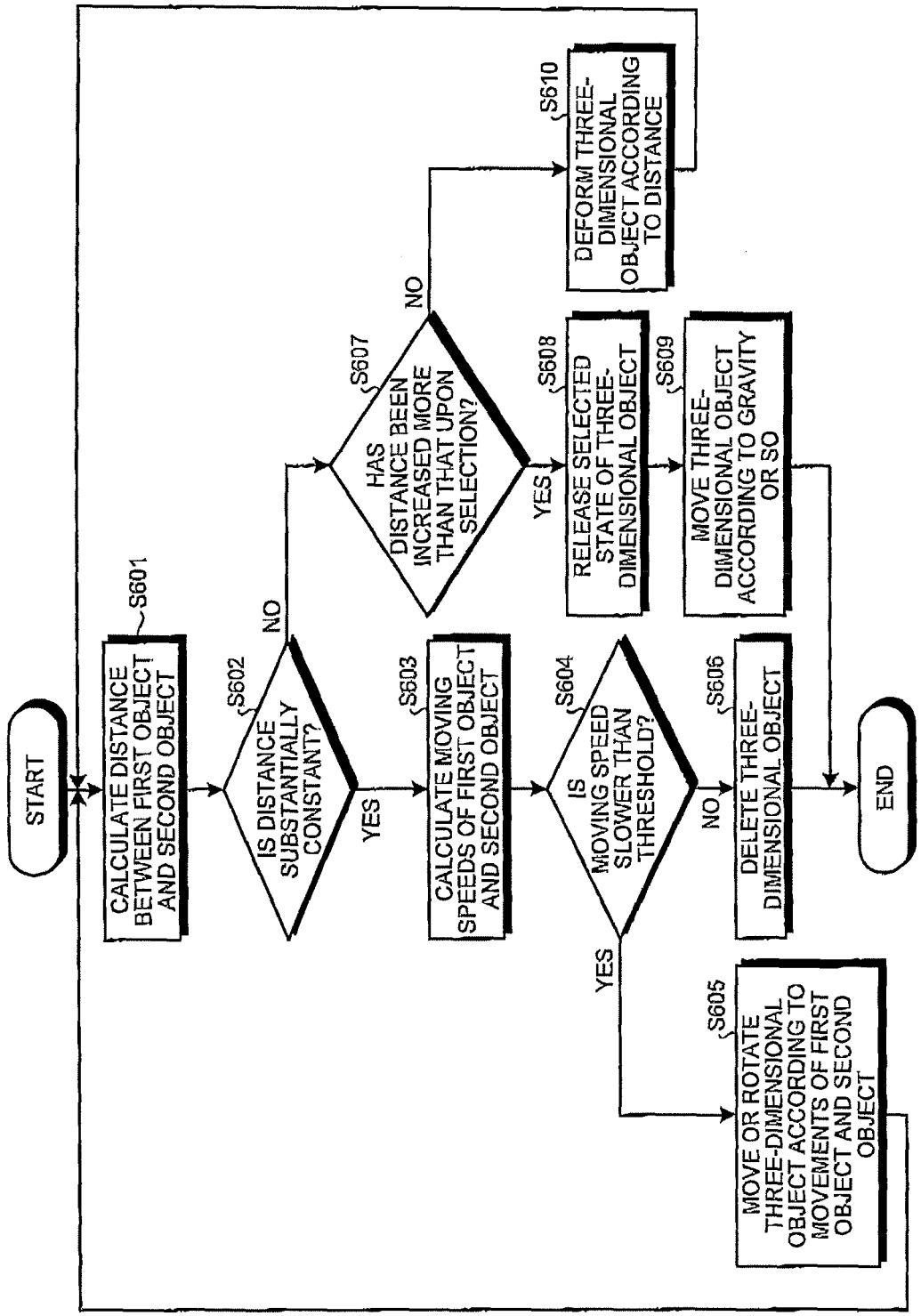
FIG. 24 is a flowchart of a procedure of an operation detecting process according to the fourth embodiment.

FIG. 24 is a flowchart of a procedure of the operation detecting process according to the fourth embodiment. The procedure illustrated in FIG. 24 is implemented by the control unit 22 executing the control program 24a.

As illustrated in FIG. 24, first of all, at Step S601, the control unit 22 calculates a distance between the first object and the second object. Then at Step S602, the control unit 22 determines whether the distance between the first object and the second object after the operation detecting process is started is substantially constant. The distance being substantially constant means that, for example, a change amount of the distance between the first object and the second object at a current time point falls within a predetermined range (which is ±10% or so of a maximum change amount of the distance when the first object and the second object move at a normal speed), as compared with the distance at the time of starting the operation detecting process. When the distance between the first object and the second object is continuously reduced after the start of the operation detecting process (when the first object and the second object are moving in a direction of crushing the three-dimensional object), it may be determined that the distance is substantially constant. Alternatively, when the distance between the two changes only within a range due to the shaky movement of the hand, it may be determined that the distance is substantially constant.

When the distance between the first object and the second object is substantially constant (Yes at Step S602), then at Step S603, the control unit 22 calculates moving speeds of the first object and the second object. Subsequently, at Step S604, the control unit 22 determines whether each of the calculated moving speeds is slower than a threshold. The threshold used here is, for example, a moving speed of fingertips when one throws something. The moving speed compared with the threshold may be an average of the moving speed of the first object and the moving speed of the second object, or may be a higher one of them, or may be a lower one of them.

When the moving speed is slower than the threshold (Yes at Step S604), then at Step S605, the control unit 22 moves or rotates the three-dimensional object according to detected moves of the first object and the second object. For example, when it is detected that the first object and the second object move rightward, the control unit 22 moves the three-dimensional object rightward according to the movements of the first object and the second object. When it is detected that the first object and the second object rotate counterclockwise, the control unit 22 rotates the three-dimensional object counterclockwise according to the rotation of the first object and the second object. When the movement and the rotation are simultaneously detected, the movement and the rotation of the three-dimensional object are simultaneously executed. If there is an obstacle against the movement and/or the rotation of the three-dimensional object, the movement and/or the rotation of the three-dimensional object may be stopped when the three-dimensional object comes in contact with the obstacle. The control unit 22 then re-executes Step S601 and the subsequent steps.

When the moving speed is not slower than the threshold (No at Step S604), then at Step S606, the control unit 22 deletes the three-dimensional object. When the three-dimensional object is to be deleted, animation display may be used as if the three-dimensional object flies toward a moving direction of the first object and the second object. The control unit 22 then ends the operation detecting process. In this way, the three-dimensional object is deleted when the first object and the second object move at a high speed as if the three-dimensional object is thrown; thereby, the deletion of the three-dimensional object can be implemented with an intuitive operation. The deletion of the three-dimensional object may be assigned to, for example, the operation of crushing the three-dimensional object instead of the operation for moving the first object and the second object at a high speed. Instead of deleting the three-dimensional object, the three-dimensional object may be returned to its initial position.

When the distance between the first object and the second object is not substantially constant (No at Step S602), then at Step S607, the control unit 22 determines whether the distance has been increased more than that upon selection of the three-dimensional object, that is, upon start of the operation detecting process. When the distance has been increased (Yes at Step S607), then at Step S608, the control unit 22 releases the selected state of the three-dimensional object. The operation of increasing the distance between the first object and the second object is similar to an operation of releasing a pinched actual object. Therefore, such an operation is intuitive and easy to understand as an operation for releasing the selection of the three-dimensional object.

Subsequently, at Step S609, the control unit 22 moves the three-dimensional object, whose selected state has been released, according to gravity or so. The control unit 22 then ends the operation detecting process. The movement in this case is displayed in such a manner that the three-dimensional object falls according to gravity and stops on a floor or a table. Before the move of the three-dimensional object is stopped, the three-dimensional object may be bounded according to the elasticity of the three-dimensional object or according to the hardness of the floor or the table. The magnitude of impact produced when the three-dimensional object bumps against the floor or the table may be calculated, and if the impact is greater than a predetermined value, then the three-dimensional object may be displayed as if it is broken. The three-dimensional object may be moved more slowly than a case where actual gravity works.

When the distance between the first object and the second object has been reduced more than that upon selection of the three-dimensional object (No at Step S607), then at Step S610, the control unit 22 deforms the three-dimensional object according to the distance. The control unit 22 then re-executes Step S601 and the subsequent steps. The degree of deformation of the three-dimensional object may be changed according to, for example, the elasticity set as an attribute to the three-dimensional object. For an object whose hardness is set to be low as an attribute like a three-dimensional object resembling a rubber ball, the control unit 22 may increase the degree of deformation according to how the distance between the first object and the second object is reduced. For an object whose hardness is set to be high as an attribute like a three-dimensional object resembling blocks, the control unit 22 may keep low the degree of deformation even if the distance between the first object and the second object is reduced.

When the distance between the first object and the second object is reduced more than that upon selection of the three-dimensional object, the three-dimensional object may be reduced instead of deformation thereof. When the distance between the first object and the second object becomes smaller than a predetermined value, the three-dimensional object may be displayed as if it is broken.

As explained above, the fourth embodiment is configured so that the three-dimensional object is pinched when the state in which the three-dimensional object is located between the objects such as the fingers continues for the longer period of time than the predetermined time. Therefore, the selection of the three-dimensional object can be implemented with an intuitive and easy-to-understand operation.

A fifth embodiment is explained below. The mobile phone 1 according to the fifth embodiment is different in a procedure of the selection detecting process executed based on the functions provided by the control program 24a from that according to the fourth embodiment. However, it is configured in the same manner as the mobile phone 1 according to the fourth embodiment in terms of the hardware. Therefore, in the fifth embodiment, explanation that overlaps with the explanation in the fourth embodiment is omitted, and the selection detecting process is mainly explained below.

Figure 25:
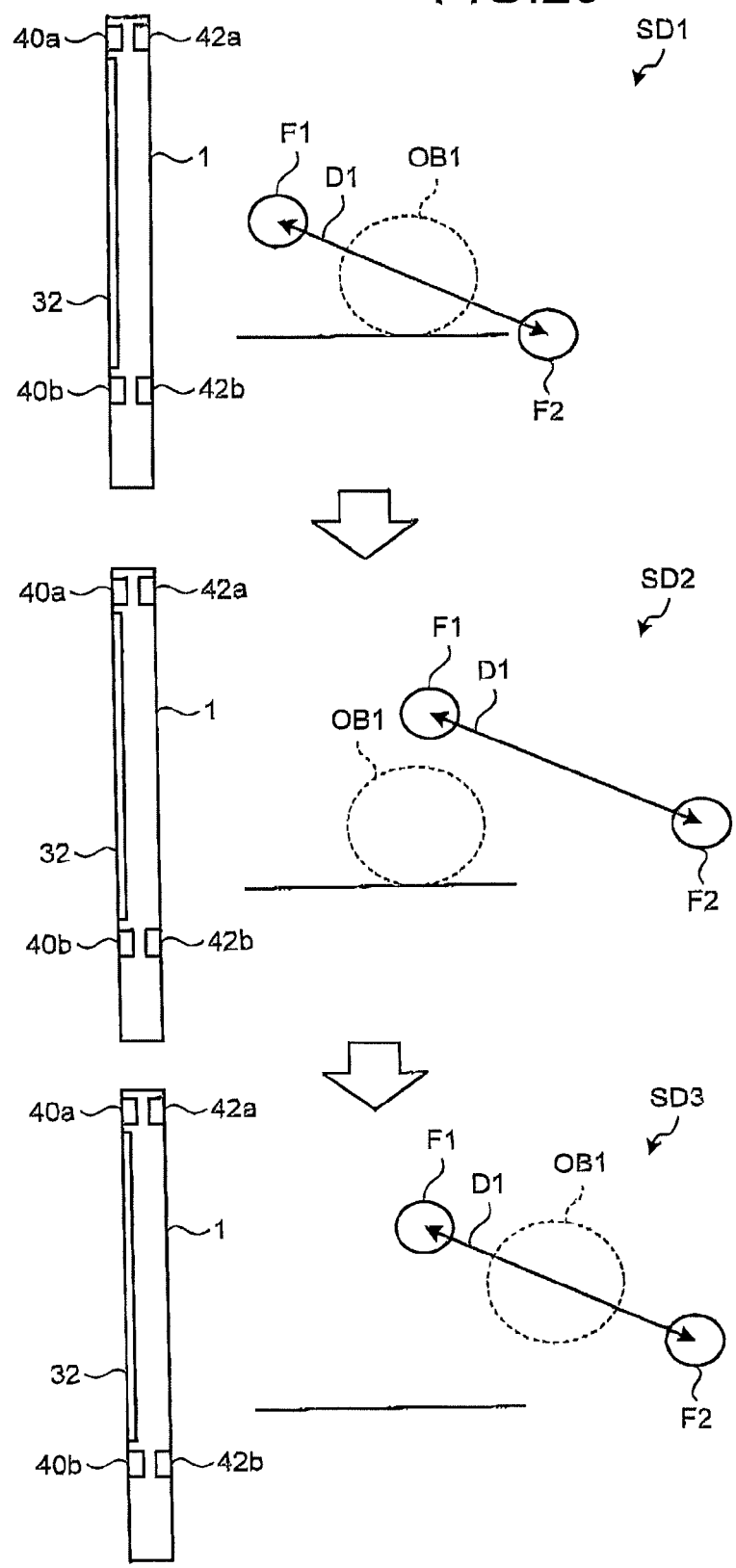
FIG. 25 is a diagram for explaining detection of an operation performed for the three-dimensional object according to a fifth embodiment.

First of all, detection of an operation performed for a three-dimensional object is explained with reference to FIG. 25. FIG. 25 is a diagram for explaining detection of an operation performed for the three-dimensional object according to the fifth embodiment. At Step SD1 in FIG. 25, the touch panel 32 stereoscopically displays the three-dimensional object OB1 in the three-dimensional space on the back face side. To select the three-dimensional object OB1, the user moves the finger F1 and the finger F2 so that the three-dimensional object OB1 is located between the finger. F1 and the finger F2.

When two objects are detected within the three-dimensional space and the three-dimensional object OB1 is located between the two objects, the mobile phone 1 monitors a change in the distance between the two objects. When the distance is substantially constant for the longer period of time than the predetermined time, the mobile phone 1 determines that the three-dimensional object OB1 has been selected, and sets the three-dimensional object OB1 to be in the selected state. The mobile phone 1 then changes the display mode, or so, of the three-dimensional object OB1 to notify the user that the three-dimensional object OB1 is in the selected state.

There is no need for the two objects to remain in positions where the three-dimensional object OB1 is sandwiched therebetween while the mobile phone 1 is monitoring the change in the distance between the two objects. Namely, the user moves the finger F1 and the finger F2 so that the three-dimensional object OB1 is located between the finger F1 and the finger F2 as illustrated at Step SD1, and thereafter the user may move the finger F1 and the finger F2 to some other positions without maintaining the state.

It is assumed, as illustrated at Step SD2, that the user moves the finger F1 and the finger F2 from the state of Step SD1 while a distance D1 between the finger F1 and the finger F2 is maintained substantially constant. In this case, as illustrated at Step SD3, the mobile phone 1 sets the three-dimensional object OB1 to be in the selected state at the stage when the state in which the distance D1 between the finger F1 and the finger F2 is maintained substantially constant continues for the longer period of time than the predetermined time. The mobile phone 1 then moves the three-dimensional object OB1 into position between the finger F1 and the finger F2 as if it has already been selected at the stage of Step SD1. The moves of the finger F1 and the finger F2 from Step SD1 to Step SD3 may be stored, and the three-dimensional object OB1 may be rotated or so according to the stored moves. Thereafter, the mobile phone 1 makes a change such as movement, deformation, or deletion to the three-dimensional object OB1 according to the moves of the finger F1 and the finger F2.

In this way, after the two objects are moved once to the positions where the three-dimensional object OB1 is sandwiched therebetween, the three-dimensional object can be selected even if the objects do not remain in the positions; thereby, the user can quickly start the operation after he/she selects the three-dimensional object.

Figure 26:
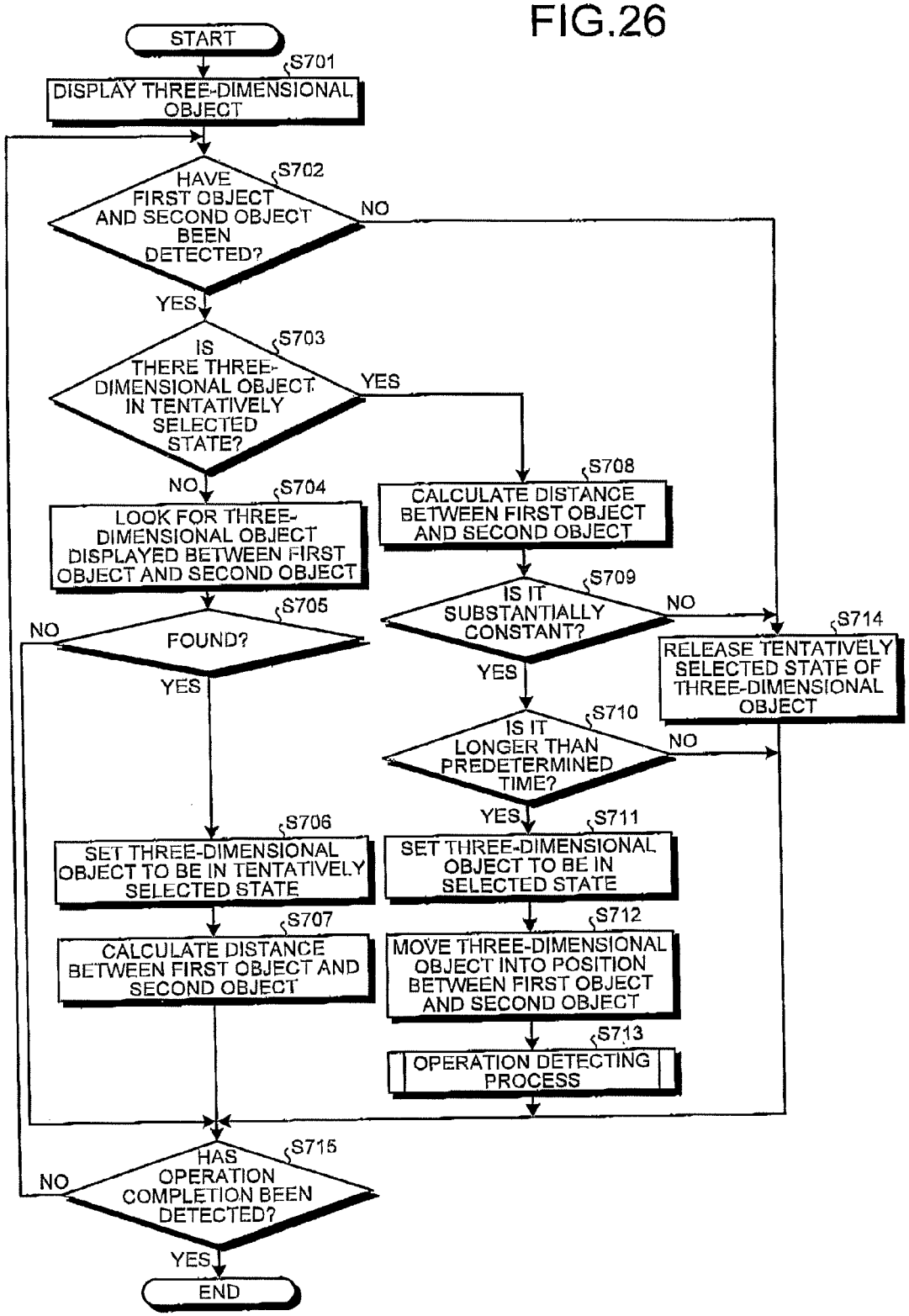
FIG. 26 is a flowchart of a procedure of a selection detecting process according to the fifth embodiment.

Then, a procedure for operations of the three-dimensional object executed by the mobile phone 1 is explained below with reference to FIG. 26. FIG. 26 is a flowchart of the procedure of the selection detecting process for the three-dimensional object according to the fifth embodiment. The procedure illustrated in FIG. 26 is implemented by the control unit 22 executing the control program 24a triggered by detection of a predetermined operation or the like.

As illustrated in FIG. 26, first of all, at Step S701, the control unit 22 stereoscopically displays the three-dimensional object. Subsequently, at Step S702, the control unit 22 determines whether the detectors, that is, the imaging units 40a and 40b or the imaging units 42a and 42b have detected the first object and the second object. When the first object and the second object have not been detected (No at Step S702), then at Step S714, the control unit 22 releases, if there is a three-dimensional object in a tentatively selected state, the tentatively selected state of the three-dimensional object. The tentatively selected state represents a state where it is detected that the three-dimensional object is displayed between the two objects and thereafter it is monitored whether the distance between the two objects is maintained substantially constant.

The control unit 22 determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the first object and the second object have been detected (Yes at Step S702), then at Step S703, the control unit 22 determines whether there is a three-dimensional object in the tentatively selected state. When there is no three-dimensional object in the tentatively selected state (No at Step S703), then at Step S704, the control unit 22 looks for a three-dimensional object displayed between the first object and the second object, from among displayed three-dimensional objects.

When there is no corresponding three-dimensional object (No at Step S705), then at Step S715, the control unit 22 determines whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the three-dimensional object displayed between the first object and the second object has been found (Yes at Step S705), then at Step S706 the control unit 22 sets the three-dimensional object displayed between the first object and the second object to be in the tentatively selected state. The control unit 22 calculates, at Step S707, a distance between the first object and the second object.

The control unit 22 determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the first object and the second object have been detected and there is a three-dimensional object in the tentatively selected state (Yes at Step S703), then at Step S708, the control unit 22 calculates a distance between the first object and the second object. The control unit 22 determines at Step S709 whether the distance is substantially constant. When the distance is not substantially constant (No at Step S709), then at Step S714, the control unit 22 releases the tentatively selected state of the three-dimensional object in the tentatively selected state.

The control unit 22 determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the distance between the first object and the second object is substantially constant (Yes at Step S709), then at Step S710, the control unit 22 determines whether a time during which the distance is maintained substantially constant is longer than a predetermined time. When the time during which the distance is maintained substantially constant is not longer than the predetermined time (No at Step S710), then at Step S715, the control unit 22 determines whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the time during which the distance is maintained substantially constant is longer than the predetermined time (Yes at Step S710), then at Step S711, the control unit 22 sets the three-dimensional object displayed between the first object and the second object to be in the selected state. At Step S712, the control unit 22 moves the three-dimensional object OB1 into position between the first object and the second object. Then at Step S713, the control unit 22 executes the operation detecting process illustrated in FIG. 24, and changes, during its execution, the three-dimensional object in the selected state according to the detected operation.

After the completion of the operation detecting process, the control unit 22 determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

As explained above, according to the fifth embodiment, the mobile phone 1 is configured so as to select the three-dimensional object when the three-dimensional object is located between the objects such as the fingers and then the distance between the objects is maintained substantially constant for the longer period of time than the predetermined time. Therefore, the user can quickly start the operation after the selection of the three-dimensional object.

A sixth embodiment is explained below. The mobile phone 1 according to the sixth embodiment is different in procedures of the selection detecting process and the operation detecting process executed based on the functions provided by the control program 24a from that according to the fourth embodiment. However, it is configured in the same manner as the mobile phone 1 according to the fourth embodiment in terms of the hardware. Therefore, in the sixth embodiment, explanation that overlaps with the explanation in the fourth embodiment is omitted, and the selection detecting process and the operation detecting process are mainly explained below.

Figure 27:
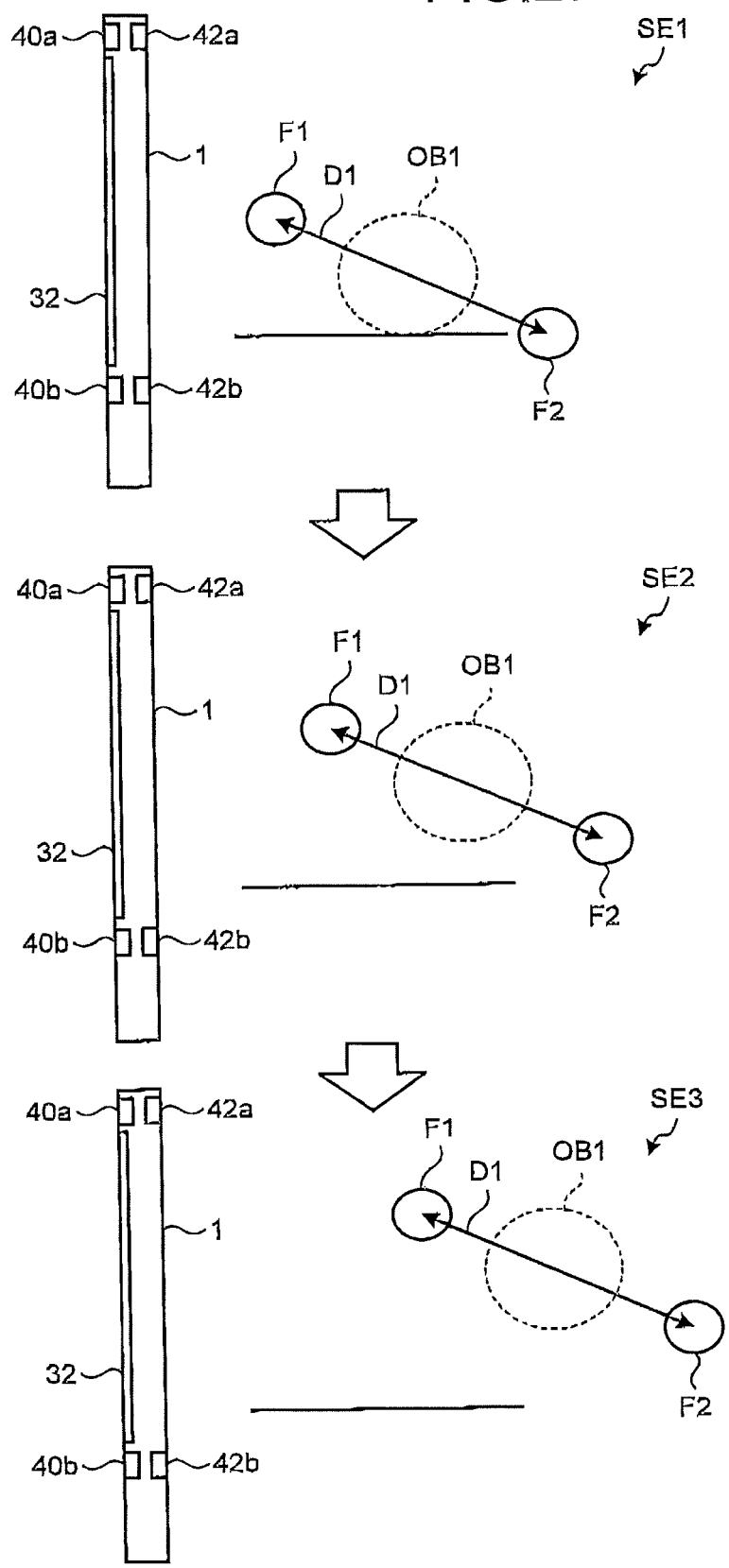
FIG. 27 is a diagram for explaining detection of an operation performed for the three-dimensional object according to a sixth embodiment.
Figure 28:
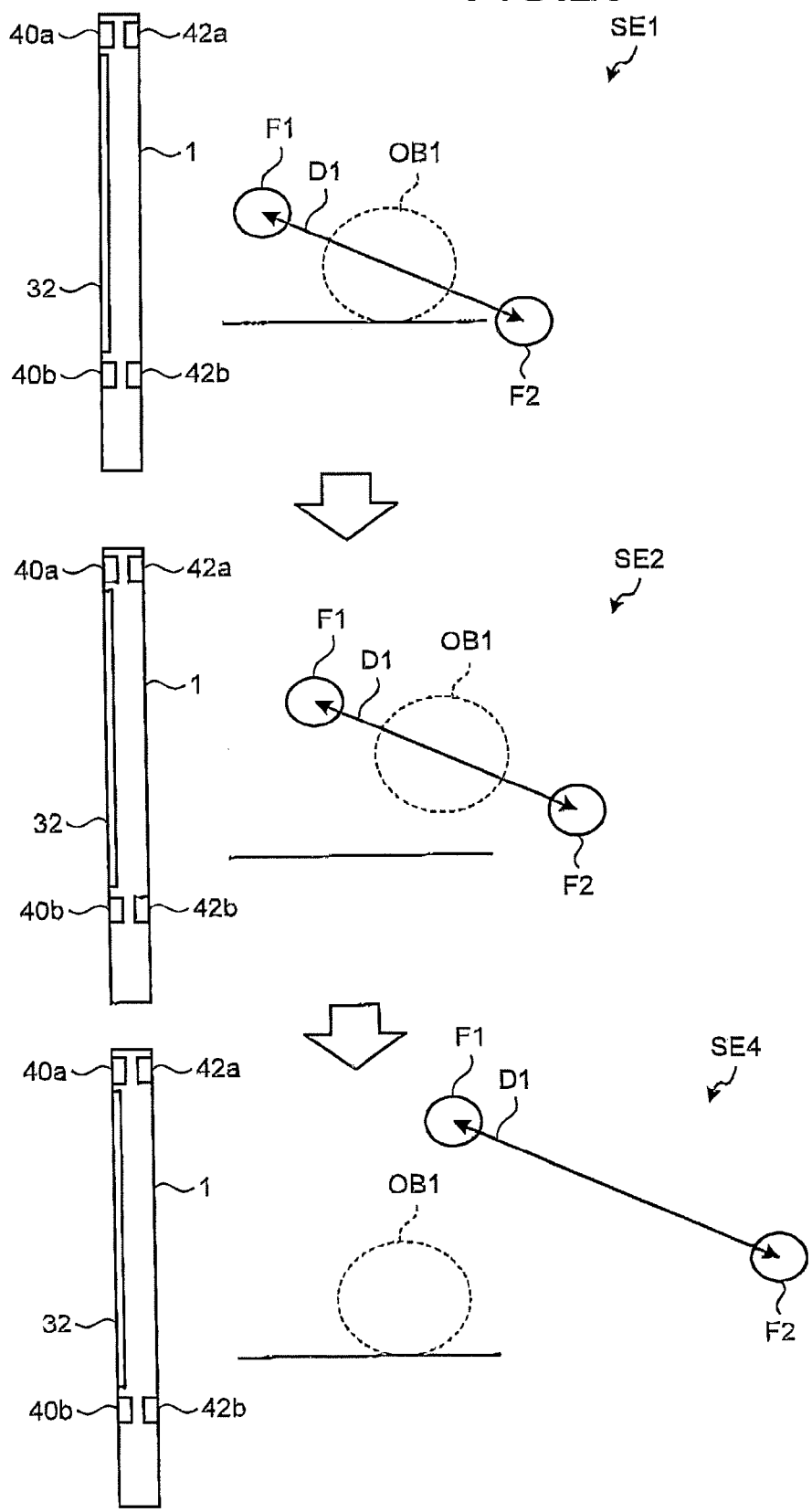
FIG. 28 is a diagram for explaining detection of an operation performed for the three-dimensional object according to the sixth embodiment.

First of all, detection of an operation performed for a three-dimensional object is explained with reference to FIG. 27 and FIG. 28. FIG. 27 and FIG. 28 are diagrams for explaining detection of an operation performed for the three-dimensional object according to the sixth embodiment. At Step SE1 in FIG. 27, the touch panel 32 stereoscopically displays the three-dimensional object OB1 in the three-dimensional space. To select the three-dimensional object OB1, the user moves the finger F1 and the finger F2 so that the three-dimensional object OB1 is located between the finger F1 and the finger F2.

When two objects are detected within the three-dimensional space and the three-dimensional object OB1 is located between the two objects, the mobile phone 1 monitors a change in a distance between the two objects. When the distance is substantially constant for the longer period of time than the predetermined time, the mobile phone 1 determines that the three-dimensional object OB1 has been selected, and sets the three-dimensional object OB1 to be in the selected state. The mobile phone 1 then changes the display mode, or so, of the three-dimensional object OB1 to notify the user that the three-dimensional object OB1 is in the selected state.

There is no need for the two objects to remain in positions where the three-dimensional object OB1 is sandwiched therebetween while the mobile phone 1 is monitoring the change in the distance between the two objects. Namely, the user moves the finger F1 and the finger F2 so that the three-dimensional object OB1 is located between the finger F1 and the finger F2 as illustrated at Step SE1, and thereafter the user may move the finger F1 and the finger F2 to some other positions without maintaining the state.

It is assumed, as illustrated at Step SE2, that the user moves the finger F1 and the finger F2 from the state of Step SE1 while maintaining the distance D1 between the finger F1 and the finger F2 substantially constant. In this case, the mobile phone 1 makes a change such as movement, deformation, or deletion to the three-dimensional object OB1 according to the moves of the finger F1 and the finger F2 from the stage when it is detected that the three-dimensional object OB1 is displayed between the finger F1 and the finger F2, that is, from the stage of Step SE1. Then, as illustrated at Step SE3, the mobile phone 1 sets the three-dimensional object OB1 to be in the selected state at the stage when the state in which the distance D1 between the finger F1 and the finger F2 is maintained substantially constant continues for the longer period of time than the predetermined time.

As illustrated at Step SE4 in FIG. 28, when the distance D1 between the finger F1 and the finger F2 is increased before the predetermined time elapses, that is, when the selection is not performed, the mobile phone 1 makes a reverse change, to the change made so far, to the three-dimensional object OB1. Consequently, the three-dimensional object OB1 is displayed at the same position as that at the stage of Step SE1 in the same state. The speed at which the reverse change is made to the three-dimensional object OB1 may be higher than the speed at which the change is made to the three-dimensional object OB1 so far. Namely, the three-dimensional object OB1 may be reversely changed as if it is reversely reproduced at a high speed.

In this way, by starting making the change to the three-dimensional object from the stage when it is detected that the three-dimensional object is displayed between the two objects is detected, the user can recognize that the three-dimensional object is being selected before the selection is determined. As a result, the user is able to know, at an early point, whether an intended three-dimensional object is selected. Until the state in which the distance between the two objects is maintained substantially constant continues for the longer period of time than the predetermined time, the three-dimensional object with the change being made thereto may be displayed in a mode (e.g., half-transparent mode) different from the normal mode or from the mode in the selected state, so that the user can easily determine the state of the three-dimensional object.

Figure 29:
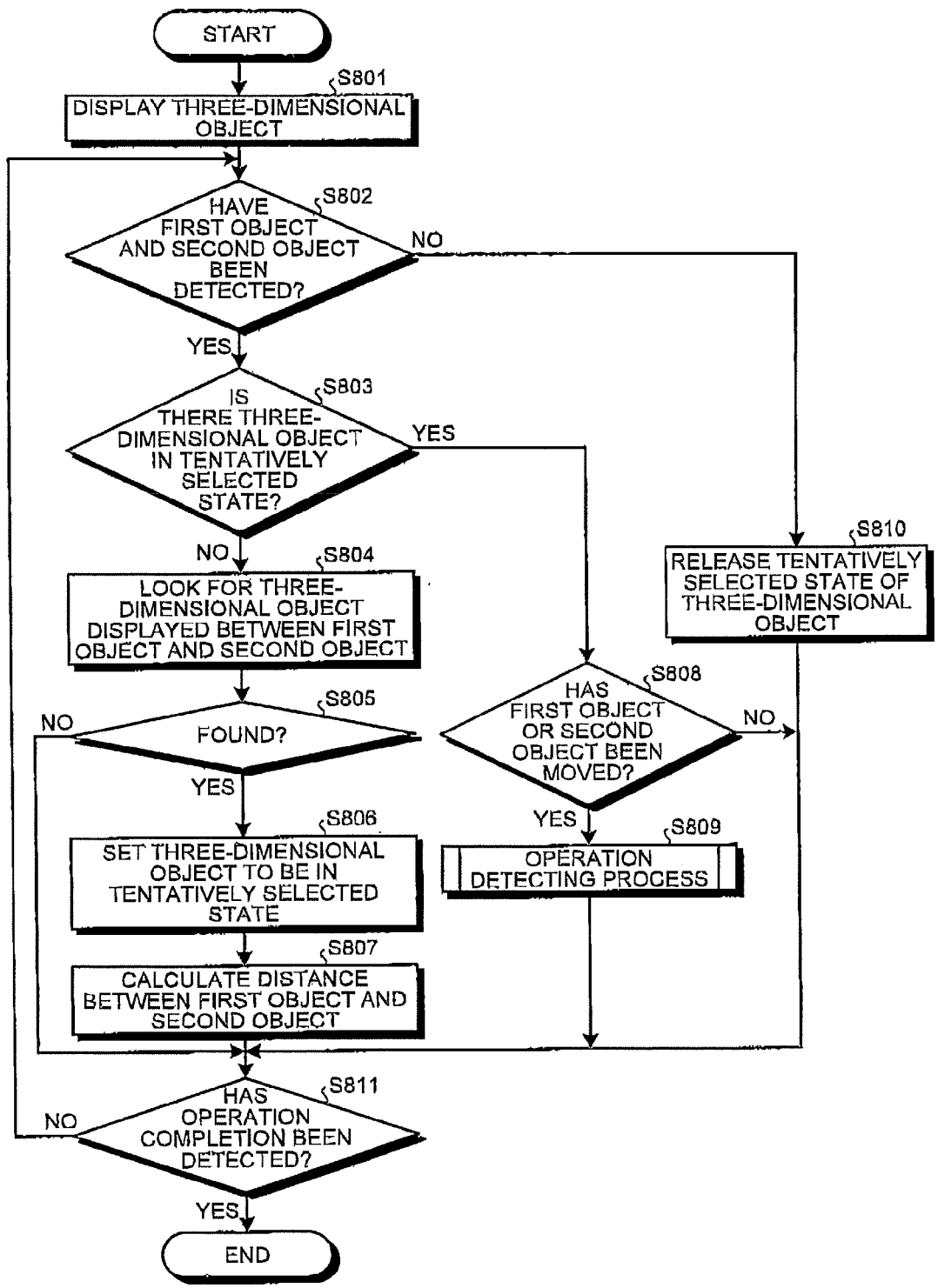
FIG. 29 is a flowchart of a procedure of a selection detecting process according to the sixth embodiment.

Then, a procedure for operations of the three-dimensional object executed by the mobile phone 1 is explained below with reference to FIG. 29 and FIG. 30. FIG. 29 is a flowchart of the procedure of the selection detecting process for the three-dimensional object according to the sixth embodiment. The procedure illustrated in FIG. 29 is implemented by the control unit 22 executing the control program 24a triggered by detection of a predetermined operation or the like.

As illustrated in FIG. 29, first of all, at Step S801, the control unit 22 stereoscopically displays the three-dimensional object. Subsequently, at Step S802, the control unit 22 determines whether the detectors, that is, the imaging units 40a and 40b or the imaging units 42a and 42b have detected have detected the first object and the second object. When the first object and the second object have not been detected (No at Step S802), then at Step S810, the control unit 22 releases, if there a three-dimensional object in the tentatively selected state, the tentatively selected state of the three-dimensional object.

The control unit 22 determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When the first object and the second object have been detected (Yes at Step S802), then at Step S803, the control unit 22 determines whether there is a three-dimensional object in the tentatively selected state. When there is no three-dimensional object in the tentatively selected state (No at Step S803), then at Step S804, the control unit 22 looks for a three-dimensional object displayed between the first object and the second object, from among displayed three-dimensional objects.

When there is no corresponding three-dimensional object (No at Step S805), then at Step S811, the control unit 22 determines whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When the three-dimensional object displayed between the first object and the second object has been found (Yes at Step S805), then at Step S806, the control unit 22 sets the three-dimensional object displayed between the first object and the second object to be in the tentatively selected state. The control unit 22 calculates, at Step S807, a distance between the first object and the second object.

The control unit 22 determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When the first object and the second object have been detected and there is a three-dimensional object in the tentatively selected state (Yes at Step S803), then at Step S808, the control unit 22 determines whether at least one of the first object and the second object has been moved. When neither the first object nor the second object has been moved (No at Step S808), then at Step S811, the control unit 22 determines whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

Figure 30:
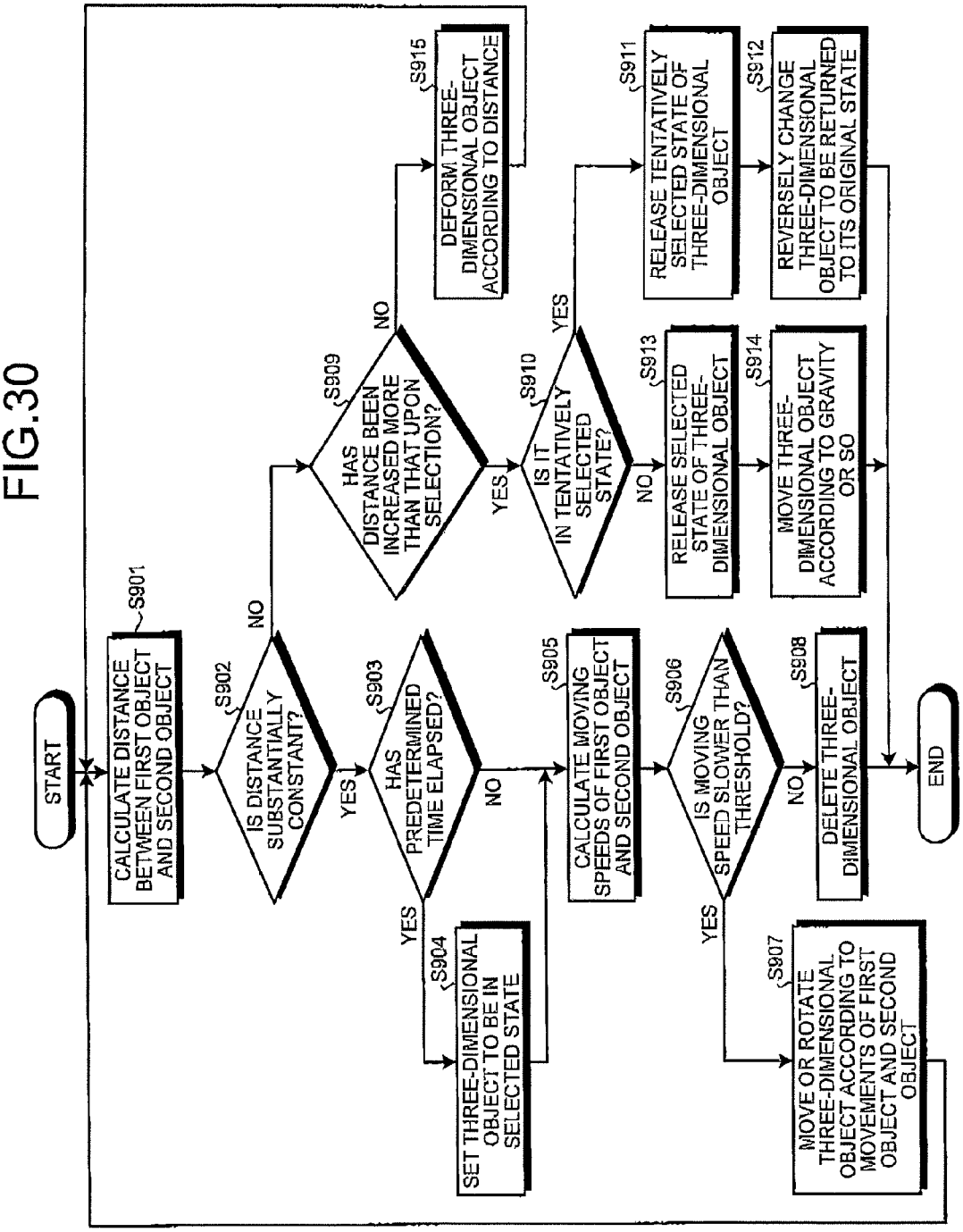
FIG. 30 is a flowchart of a procedure of an operation detecting process according to the sixth embodiment.

When at least one of the first object and the second object has been moved (Yes at Step S808), then at Step S809, the control unit 22 executes the operation detecting process illustrated in FIG. 30, and changes, during its execution, the three-dimensional object in the selected state according to the detected operation.

After the completion of the operation detecting process, the control unit 22 determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

FIG. 30 is a flowchart of a procedure of the operation detecting process according to the sixth embodiment. The procedure illustrated in FIG. 30 is implemented by the control unit 22 executing the control program 24a. As illustrated in FIG. 30, first of all, at Step S901, the control unit 22 calculates a distance between the first object and the second object. Then at Step S902, the control unit 22 determines whether the distance between the first object and the second object after the start of the operation detecting process is substantially constant.

When the distance between the first object and the second object is substantially constant (Yes at Step S902), then at Step S903, the control unit 22 determines whether a predetermined time has elapsed since the start of the operation detecting process. When the predetermined time has elapsed (Yes at Step S903), then at Step S904, the control unit 22 sets, if there is a three-dimensional object in the tentatively selected state, the three-dimensional object to be in the selected state. When the predetermined time has not elapsed (No at Step S903), the control unit 22 does not execute Step S904.

Subsequently, at Step S905, the control unit 22 calculates moving speeds of the first object and the second object. Then at Step S906, the control unit 22 determines whether each of the calculated moving speeds is slower than a threshold. When the moving speed is the slower than threshold (Yes at Step S906), then at Step S907, the control unit 22 moves or rotates the three-dimensional object according to the detected moves of the first object and second object. The control unit 22 then re-executes Step S901 and the subsequent steps.

When the moving speed is higher than the threshold (No at Step S906), then at Step S908, the control unit 22 deletes the three-dimensional object. When the three-dimensional object is to be deleted, animation display may be used as if the three-dimensional object flies toward moving direction of the first object and the second object. The control unit 22 then ends the operation detecting process. The deletion of the three-dimensional object may be assigned to, for example, the operation of crushing the three-dimensional object instead of the operation for moving the first object and the second object at a high speed. Instead of deleting the three-dimensional object, the three-dimensional object may be returned to its initial position.

When the distance between the first object and the second object is not substantially constant (No at Step S902), then at Step S909, the control unit 22 determines whether the distance has been increased more than that upon selection of the three-dimensional object, that is, upon start of the operation detecting process. When the distance has been increased (Yes at Step S909), then at Step S910, the control unit 22 determines whether the three-dimensional object displayed between the first object and the second object is in the tentatively selected state.

When the three-dimensional object is in the tentatively selected state (Yes at Step S910), then at, Step S911, the control unit 22 releases the tentatively selected state of the three-dimensional object. At Step S912, the control unit 22 reversely changes the three-dimensional object to be returned to its original state. The control unit 22 then ends the operation detecting process.

When the three-dimensional object is not in the tentatively selected state, that is, is in the selected state (No at Step S910), then at Step S913, the control unit 22 releases the selected state of the three-dimensional object. At Step S914, the control unit 22 moves the three-dimensional object, whose selected state has been released, according to gravity or so. The control unit 22 then ends the operation detecting process. The movement in this case is displayed in such a manner that the three-dimensional object falls according to gravity and stops on a floor or a table. Before the movement of the three-dimensional object is stopped, the three-dimensional object may be bounded according to the elasticity of the three-dimensional object or according to the hardness of the floor or the table. The magnitude of impact produced when the three-dimensional object bumps against the floor or the table may be calculated, and if the impact is greater than a predetermined value, then the three-dimensional object may be displayed as if it is broken. The three-dimensional object may be moved more slowly than a case where actual gravity works.

When the distance between the first object and the second object has been reduced more than that upon the selection of the three-dimensional object (No at Step S909), then at Step S915, the control unit 22 deforms the three-dimensional object according to the distance. The control unit 22 then re-executes Step S901 and the subsequent steps. The degree of deformation of the three-dimensional object may be changed according to, for example, the hardness set as an attribute to the three-dimensional object.

As explained above, according to the sixth embodiment, the mobile phone 1 is configured to change the three-dimensional object according to the operation from the time when it is detected that the three-dimensional object is located between the objects such as the fingers, and therefore the user can easily recognize the selection of the three-dimensional object.

A seventh embodiment is explained below. The above-described embodiments are configured to detect the objects that operate the three-dimensional object based on the images captured by the imaging units; however, some other detection methods may be used. For example, a capacitive type touch sensor can detect a position of a finger that is not in contact with the touch sensor by increasing the sensitivity. Therefore, an example of using the touch sensor as a detector that detects objects operating a three-dimensional object is explained in the seventh embodiment. In the following explanation, the same signs as the already explained components are assigned to the same components as the already explained components. Explanation that overlaps with the above explanation may be omitted.

Figure 31:
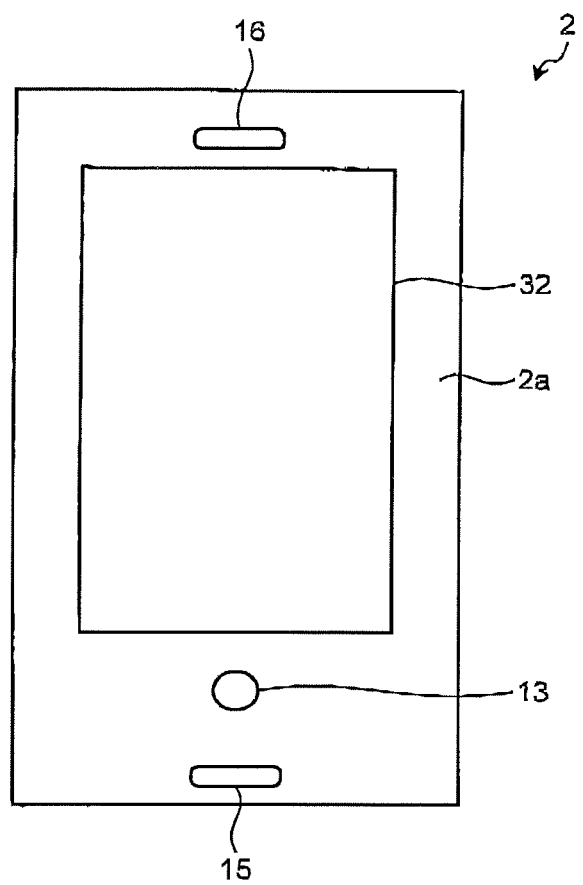
FIG. 31 is a front view of a mobile phone according to a seventh embodiment.
Figure 32:
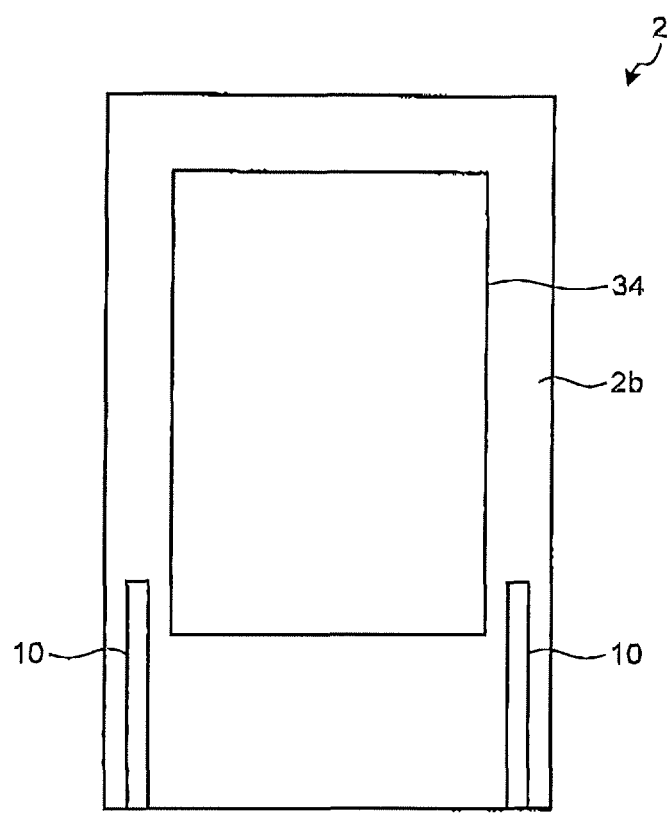
FIG. 32 is a back, view of the mobile phone according to the seventh embodiment.
Figure 33:
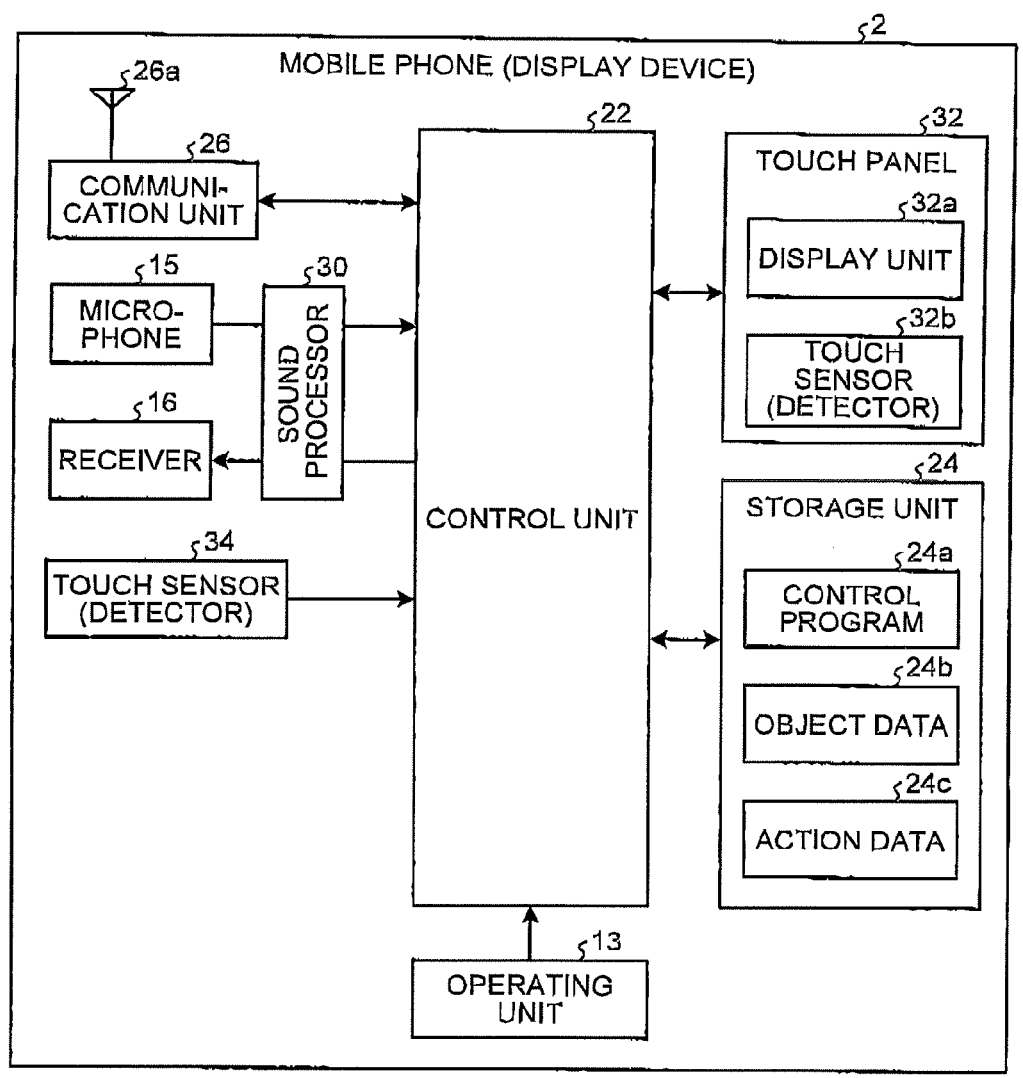
FIG. 33 is a block diagram of the mobile phone according to the seventh embodiment.

First of all, a configuration of a mobile phone (display device) 2 according to the seventh embodiment is explained below with reference to FIG. 31 to FIG. 33. FIG. 31 is a front view of the mobile phone 2. FIG. 32 is a back view of the mobile phone 2. FIG. 33 is a block diagram of the mobile phone 2.

As illustrated in FIG. 31 to FIG. 33, the mobile phone 2 includes the stand portion 10, the operating unit 13, the microphone 15, the receiver 16, the control unit 22, the storage unit 24, the communication unit 26, the sound processor 30, the touch panel 32, and a touch sensor 34.

The touch panel 32 displays various pieces of information such as characters, graphics, and images, and detects contact (s) and proximity of object(s). The touch panel 32 is structured with the display unit 32a and the touch sensor 32b so as to overlap each other. The touch sensor 32b according to the present embodiment is a capacitive type touch sensor. The touch sensor 32b functions also as a detector that detects fingers operating a three-dimensional object.

The touch sensor 34 is a capacitive type touch sensor. The touch sensor 34 functions also as a detector that detects fingers or so operating a three-dimensional object, similarly to the touch sensor 32b.

The touch sensor 34 is made of a transparent member. Therefore, the touch sensor 34 transmits light. The touch sensor 34 is provided on the back face 2b side of a hollow portion extending from its front face 2a to its back face 2b. The transparent touch panel 32 is provided on the front face 2a side of the hollow portion. Therefore, even when looking at the mobile phone 2 from the front face 2a side or even when looking at the mobile phone 2 from the back face 2b side, the user can see the other side of the mobile phone 2 through the touch panel 32 and the touch sensor 34.

Figure 34:
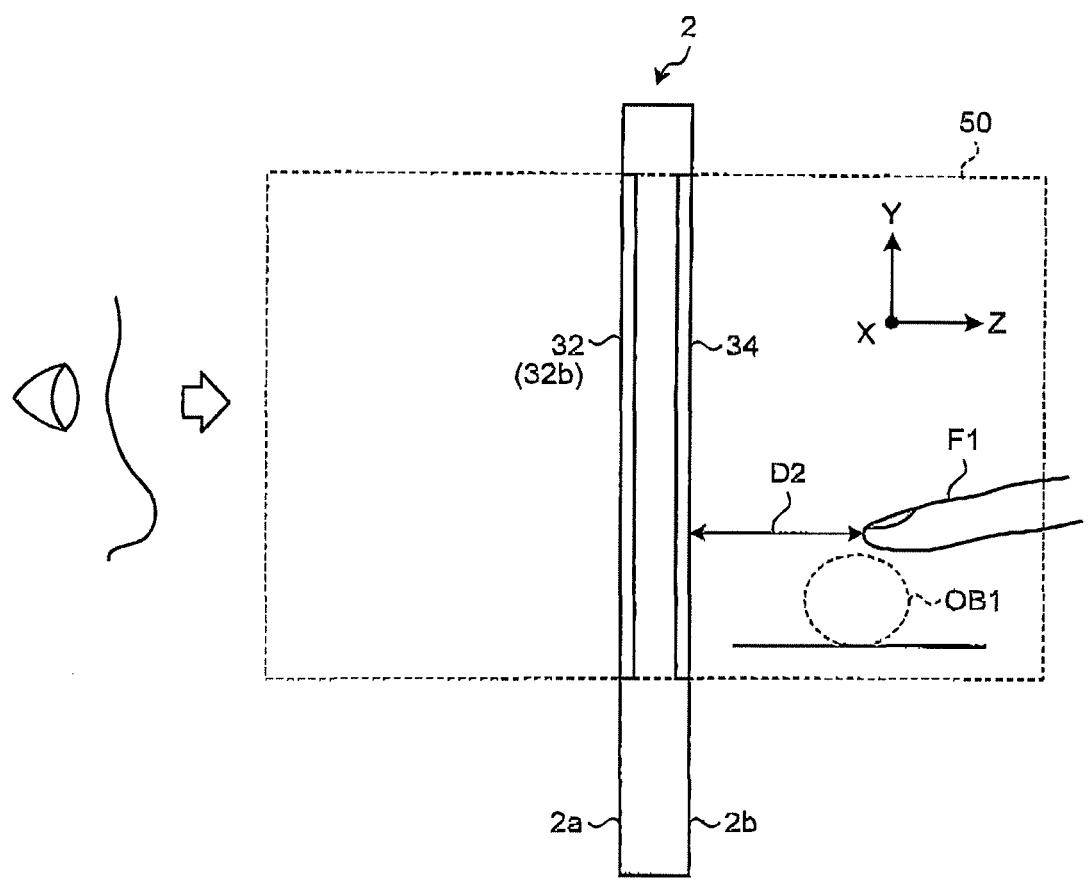
FIG. 34 is a diagram for explaining detection of an operation performed for the three-dimensional object according to the seventh embodiment.

Then, detection of an operation performed for a three-dimensional object is explained with reference to FIG. 34. FIG. 34 is a diagram for explaining detection of an operation performed for a three-dimensional object according to the seventh embodiment. As illustrated in FIG. 34, the three-dimensional object OB1 is displayed in the more backward space than the touch panel 32 and the touch sensor 34 when viewed from the user on the front face 2a side. FIG. 34 represents a case where the user is about to bring the finger F1 in contact with the three-dimensional object OB1.

In this way, when the finger F1 is on the back face 2b side, the mobile phone 2 detects the position of the finger F1 using the touch sensor 34. The touch sensor 34 can detect the position of the finger F1 in an X-axis direction and a Y-axis direction by increasing its sensitivity even if, for example, a distance from the finger F1 to the surface of the touch sensor 34 in a Z-axis direction is about 10 cm. The touch sensor 34 can detect a distance D2 from the finger F1 to the surface of the touch sensor 34 in the Z-axis direction based on the magnitude of the capacitance.

Based on the thus detected position of the finger F1 in the three-dimensional space, the mobile phone 2 can detect the contact between the finger F1 and the three-dimensional object OB1 and detect an operation of pushing the three-dimensional object OB1 with the finger F1 and an operation performed with the three-dimensional object OB1 pinched. Similarly, when the three-dimensional object is displayed on the front face 2a side and the finger F1 is on the front face 2a side, the mobile phone 2 can detect an operation of the finger F1 performed for the three-dimensional object using the touch sensor 32b of the touch panel 32.

As explained above, according to the seventh embodiment, the mobile phone 2 is configured to use the touch sensor as a detector, so that the operation performed for the three-dimensional object can be detected even by a display device without the imaging unit.

In the seventh embodiment, the mobile phone 2 is provided with the touch sensor 34 in addition to the touch panel 32. However, if the touch panel 32 can detect capacitance of the back face 2b side, the mobile phone 2 does not have to be provided with the touch sensor 34. For example, by overlaying touch sensors on both surfaces of the display unit 32a, the touch panel 32 can detect each capacitance of the front face 2a side and the back face 2b side.

To detect the operation performed for the three-dimensional object, the imaging unit and the touch sensor may be used in combination with each other. When the imaging unit is combined with the touch sensor, respective detection results may be averaged to specify the position of the finger F1. The imaging units 40a, 40b, 42a, and 42b are difficult to capture an image of the finger F1 in an area near the touch panel 32, and a detection precision of the touch sensor becomes low in an area far from the touch, panel 32. Therefore, a weighted average may be used, the weighted average being obtained by increasing weighting of the detection result of the touch sensor in the area near the touch panel 32 and by increasing weighting of the detection results of the imaging units 40a, 40b, 42a, and 42b in the area far from the touch panel 32.

Figure 35:
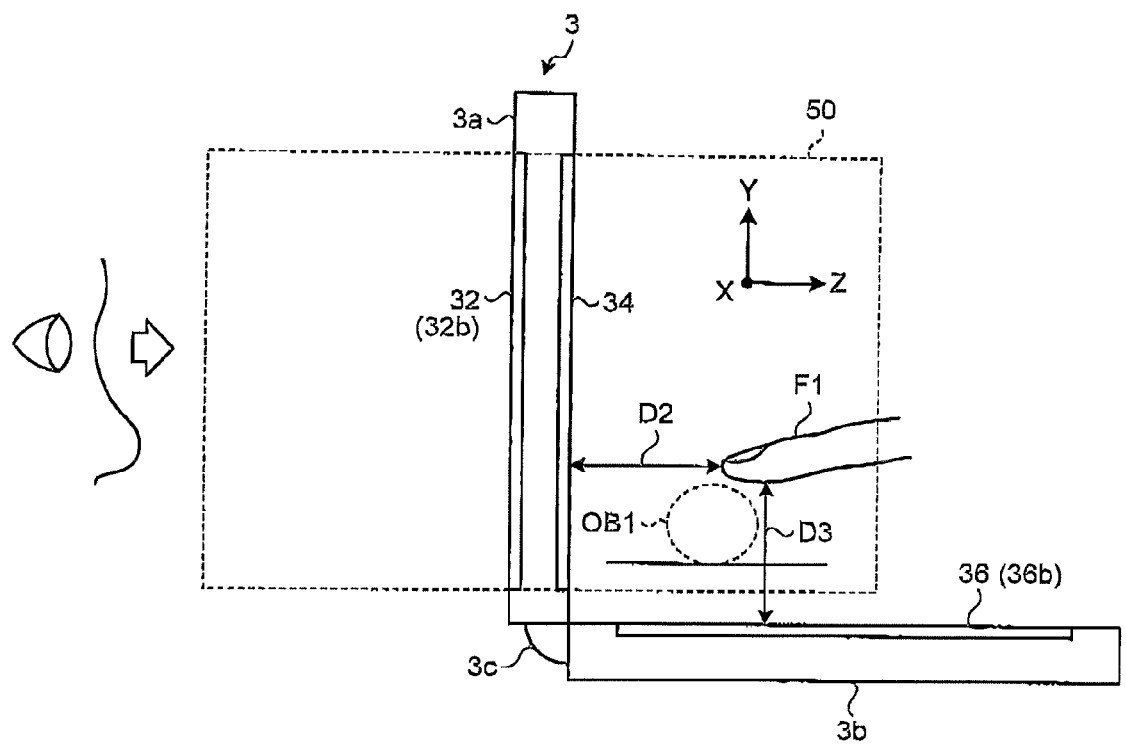
FIG. 35 is a diagram of a modification of the mobile phone according to the seventh embodiment.

To prevent the touch sensor from not detecting a position of a finger with high precision because the other finger or so may block the finger, a plurality of touch sensors may be used to detect an operation performed for the three-dimensional object. FIG. 35 is a diagram of a configuration example of a mobile phone 3 that uses a plurality of touch sensors to detect an operation performed for the three-dimensional object.

The mobile phone 3 includes a first housing 3a, a second housing 3b, and a hinge 3c. The hinge 3c couples the first housing 3a and the second housing 3b so as to be openable and closable. The first housing 3a is provided with the touch panel 32 including the touch sensor 32b, and the touch sensor 34. The second housing 3b is provided with a touch panel 36 including a touch sensor 36b. As illustrated in FIG. 35, the touch sensor 34 and the touch sensor 36b contact the three-dimensional space 50 at different angles when the first housing 3a and the second housing 3b are fixed to each other at an angle of about 90 degrees.

The touch sensor 34 can detect a position of the finger F1 in the X-axis direction and the Y-axis direction. The touch sensor 34 can also detect the distance D2 from the finger F1 to the surface of the touch panel 32 in the Z-axis direction based on the magnitude of the capacitance. The touch sensor 36b can detect a position of the finger F1 in the X-axis direction and the Z-axis direction. The touch sensor 36b can also detect a distance D3 from the finger F1 to the surface of the touch panel 36 in the Y-axis direction based on the magnitude of the capacitance.

In this way, by detecting the finger F1 from the different directions, even if there is some obstacle, the position of the finger F1 can be detected from either one of the directions. The second housing 3b has the touch panel 36 in FIG. 35; however, the second housing 3b may have only the touch sensor 36b without a display function instead of the touch panel 36.

Application examples and modifications of the display device explained in the embodiments will be explained below. A three-dimensional object (display object) being an operation target may be any object resembling an object actually existing such as a book, blocks, a spoon, chopsticks, playing cards, clay, and an instrument, or may be any object not existing such as a virtual avatar, a character in a game, and an augmented reality (AR) tag in virtual reality. The change made to the three-dimensional object according to the detected operation is not limited to the movement, the deformation, the deletion, or the like. Moreover, the change made to the three-dimensional object according to the pushing operation is not limited to these of the embodiments, and may therefore be changed according to the type of the three-dimensional object.

For example, when a three-dimensional object resembling clay (hereinafter, "clay") is determined as an operation target, the clay may be deformed according to the pushing operation, so that the user can form the clay into an arbitrary shape. In addition, the viscosity of the clay may be decreased with the elapse of time as if the clay is getting dry. When an operation of pushing the clay with the finger or the hand soaking in water being the three-dimensional object is detected, the viscosity of the clay may be improved.

When a three-dimensional object resembling a phonograph record (hereinafter, "phonograph record") is determined as an operation target, it may be set so that the phonograph record is rotated around its center and a sound is reproduced according to the pushing operation. By synchronizing the rotation with the sound reproduction, a technique such as a scratch performed by a disc jockey may be virtually achieved.

The embodiments represent the examples of displaying the three-dimensional object on either one of the front face side and the back face side of the touch panel 32; however, the three-dimensional objects may be displayed on both the front face side and the back face side of the touch panel 32. The three-dimensional object may also be displayed across the front face side and the back face side of the touch panel 32.

Figure 36:
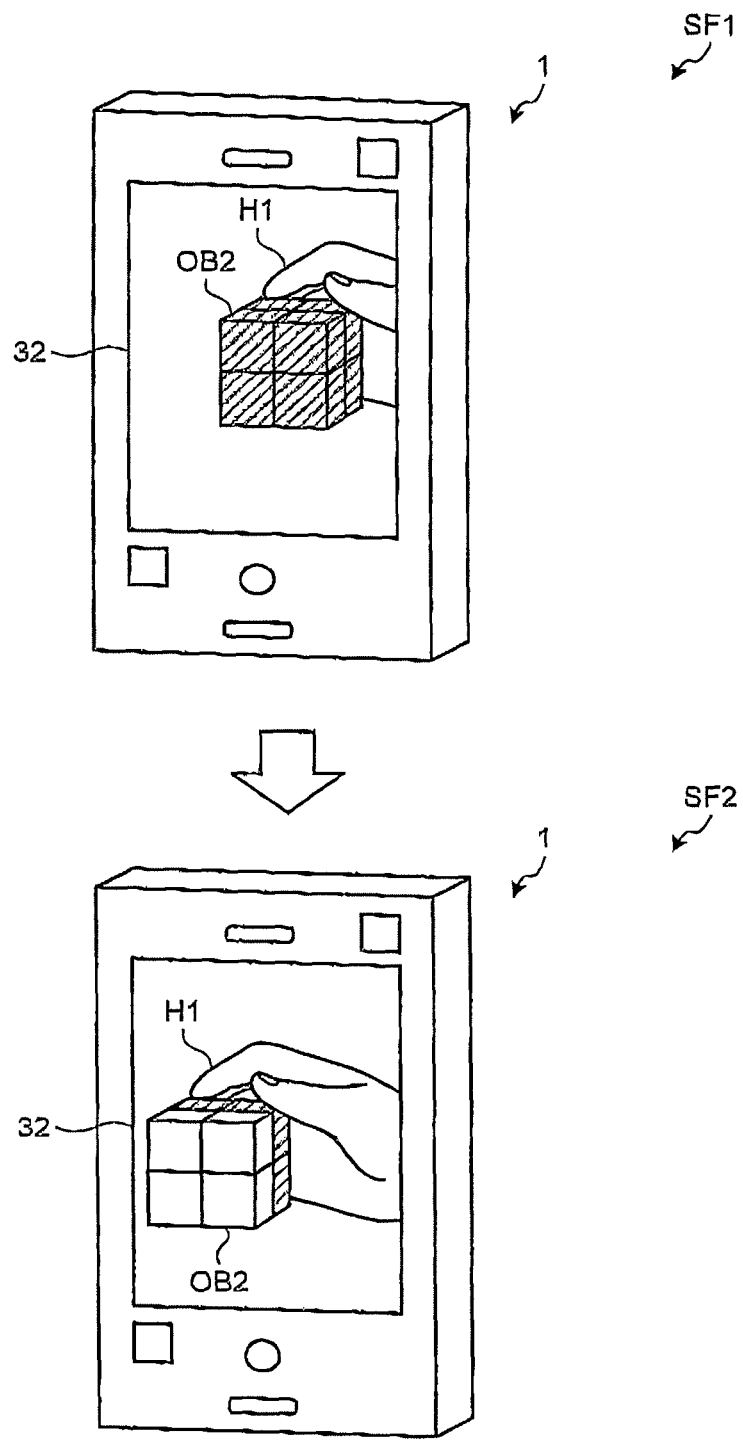
FIG. 36 is a diagram of an example of displaying the three-dimensional object across the front side and the back side of the touch panel.

For example, as illustrated at Step SF1 in FIG. 36, it is assumed that the mobile phone 1 detects an operation of pushing a three-dimensional object OB2, displayed on the back face side of the touch panel 32, to the front face side with a hand H1. In this case, as illustrated at Step SF2, the mobile phone 1 is moving the three-dimensional object OB2 to the front face side of the touch panel 32 according to the operation.

Figure 37:
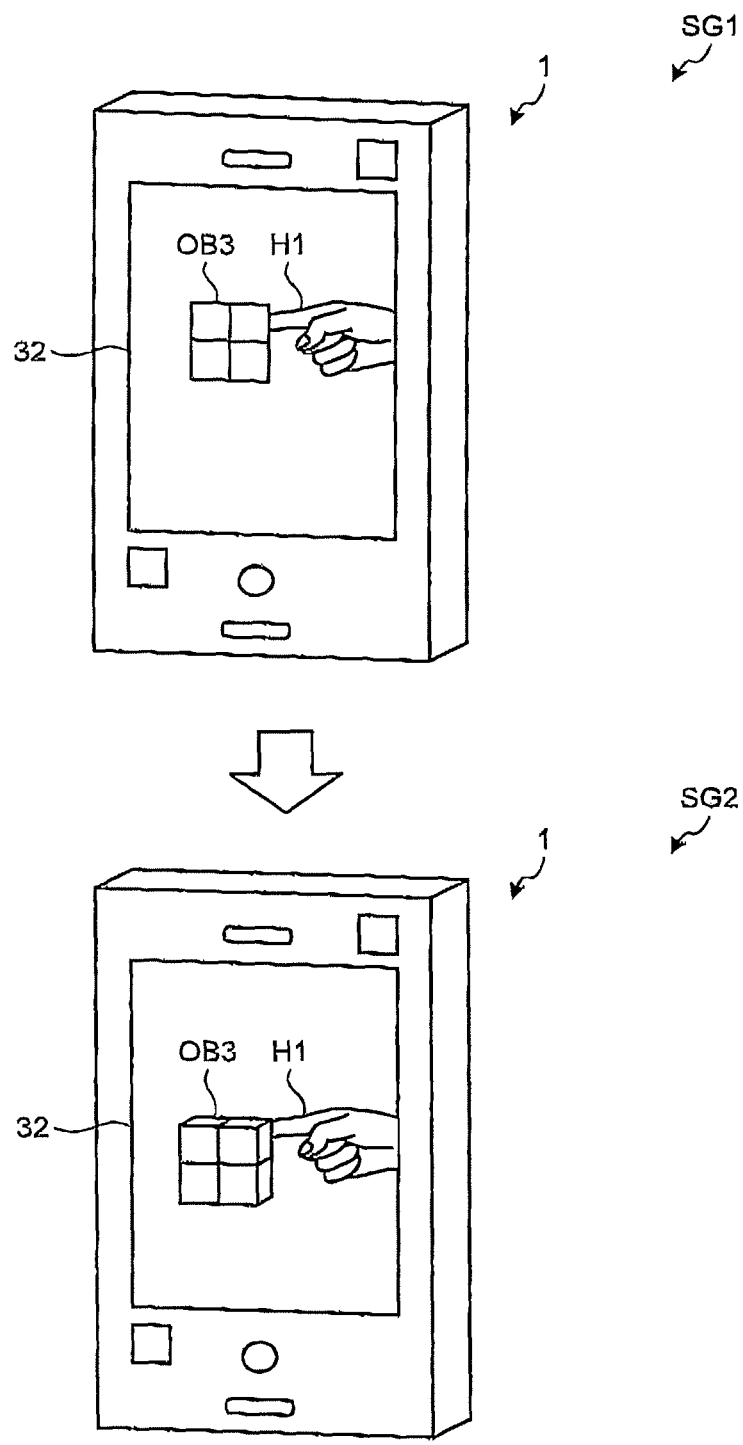
FIG. 37 is a diagram of another example of displaying the three-dimensional object across the front side and the back side of the touch panel.

As illustrated at Step SG1 in FIG. 37, it is assumed that the mobile phone 1 detects an operation of pushing an object OB3, planarly (two-dimensionally) displayed on the touch panel 32, from the back face side with the hand H1. In this case, as illustrated at Step SG2, the mobile phone 1 stereoscopically (three-dimensionally) displays the object OB3 as if it is pushed out toward the front face side of the touch panel 32 according to the operation.

The embodiments represent the examples of detecting an operation performed for the three-dimensional object on either one of the front face side and the back face side of the touch panel 32; however, the operation performed for the three-dimensional object may be detected on both the front face side and the back face side of the touch panel 32. For example, operations performed for the three-dimensional object displayed across the front face side and the back face side of the touch panel 32 are detected on both the front face side and the back face side of the touch panel 32, and the three-dimensional object may be changed according to the operations on the both sides.

The aspects of the present invention represented in the embodiments can be arbitrarily modified without departing from the spirit of the present invention. Moreover, the embodiments may be combined with each other as required. For example, the control program 24a represented in the embodiments may be divided into a plurality of modules or may be integrated with any other program. In the embodiments, the finger is used to operate the three-dimensional object; however, a stick-like object or so of which end is charged with static electricity may be used instead of the finger.

The embodiments represent the examples of using the imaging units and/or the touch sensors as the detectors in order to detect an operation performed for the three-dimensional object; however, the detector is not limited thereto. For example, a sensor using a Time-of-Flight (TOF) method may be used instead of the imaging unit. In addition, when a proximity sensor or the like capable of detecting a movement of the three-dimensional object in a planar direction of the three-dimensional space is disposed substantially horizontally with respect to a moving direction of the object, displacement of the object can be detected even in a non-contact manner, and therefore these devices may also be used. It is preferable that the displacement of the object can be detected without providing the sensor or so in the object. If the sensor or so is not provided in the object and there is therefore no need to attach an acceleration sensor to the finger or to move a display device itself with an acceleration sensor, then this leads to cost reduction.

The embodiments are configured that the display device singly detects an operation performed for the three-dimensional object; however, the display device may collaborate with a server to detect an operation performed for the three-dimensional object. In this case, the display device successively transmits information detected by the detectors to the server, and the server detects the operation to notify the display device of the detection results. Such a configuration as above enables the load on the display device to be reduced.

The embodiments represent the examples in which the display device includes a transparent touch panel; however, the display device may include a transparent display unit instead of the transparent touch panel. In this case, the display device detects a user's operation based on at least one of detection results of the operating unit including physical buttons and so on, of the touch sensor provided separately from the display unit, and of the imaging unit.

The embodiments represent the example in which the display device includes the two imaging units on the front face and the two imaging units on the back face; however, the number and the arrangement of the imaging units provided in the display device are not limited to the example.

The embodiments represent the example in which the display device with the transparent touch panel detects an operation on the back face side of the touch panel; however, a display device with a touch panel that is not transparent may detect an operation on the back face side of the touch panel.

Figure 38:
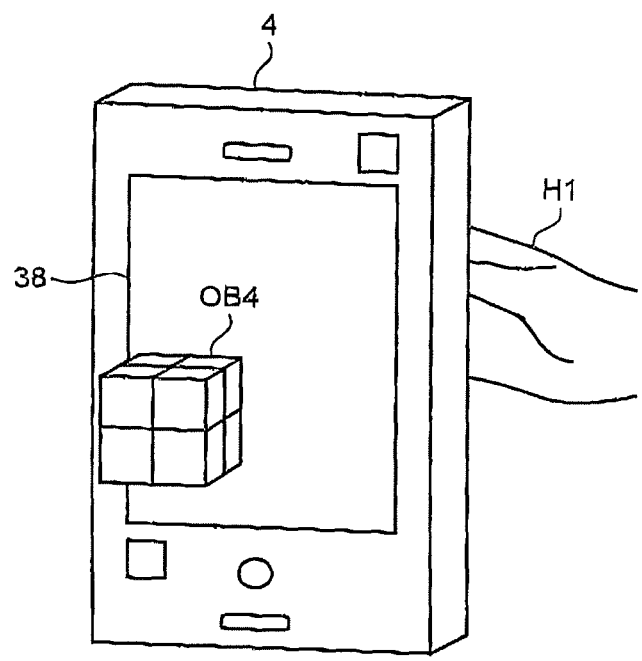
FIG. 38 is a diagram of an example of detecting an operation performed for the three-dimensional object on the back face of the touch panel that is not transparent.

For example, a display device 4 illustrated in FIG. 38 includes an opaque touch panel 38 on its front face. The touch panel 38 stereoscopically displays a three-dimensional object OB4 on the front face side of the display device 4. The display device 4 detects an operation of the hand H1 performed for the three-dimensional object OB4 on the back face side, that is, on the side of the face where the touch panel 38 is not provided. The detection of the operation by the hand H1 is implemented by using imaging units or touch sensors provided on the back face of the display device 4. In this way, an operation is performed for the three-dimensional object displayed on the front face, and the operation is detected on the back face side; thereby, the user can perform the operation using the hand H1 without preventing the display of the three-dimensional object.

Figure 39:
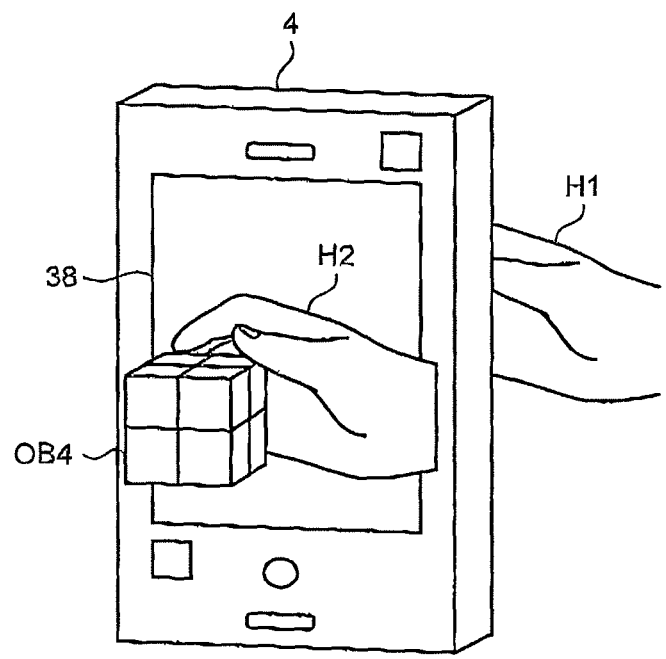
FIG. 39 is a diagram of an example of displaying a virtual hand on the touch panel that is not transparent.

As illustrated in FIG. 39, the display device 4 may display a virtual hand H2 in addition to the three-dimensional object OB4 on the touch panel 38 in association with a detection result of the detection on the back face. The display device 4 displays the hand H2 at a position corresponding to the position of the hand H1 detected on the back face, and reproduces the same operation as the operation of the hand H1 detected on the back face using the hand H2. In this way, by displaying the hand H2 on the front face side, the user can execute an operation performed for the three-dimensional object OB4 on the back face side while recognizing a correlation between the three-dimensional object OB4 and the hand H1.

The advantages are that one embodiment of the invention provides a display device that can provide the user-friendly operation method to users.

What is claimed is:

1. A display device, comprising:
    a display that has a display surface and is configured to three-dimensionally display a display object in a space on a back face side of the display surface;
    a detector for detecting an action of an object in the space on the back face side; and
    a processor for changing, when the detector detects a predetermined action of the object in the space on the back face side, the display object in the space on the back face side according to the predetermined action, wherein
    the detector is configured to detect a state, in which the object is located at a position in contact with the display object, for a longer period of time than a predetermined time,
    the processor is configured to change, after the state is detected, the display object in the space according to the action of the object, and
    when the movement of the object to the inside of the display object becomes undetectable after starting to change the display object and before elapse of the predetermined time, the processor is configured to display a reverse change to return the changed display object to its original state.

2. The display device according to claim 1, wherein
    the detector is configured to detect a further state in which the display object is located between a first object and a second object, and
    the processor is configured to change the display object when the further state is detected.

3. The display device according to claim 1, wherein
    the detector is configured to detect a further state in which the display object is located between a first object and a second object for a longer period of time than a predetermined time, and
    the processor is configured to change the display object when the further state is detected.

4. The display device according to claim 1, wherein
    the detector is configured to detect a further state in which the display object is located between a first object and a second object and a distance between the first object and the second object is not increased for a longer period of time than a predetermined time, and
    the processor is configured to change the display object when the further state is detected.

5. The display device according to claim 1, wherein
    the detector is configured to detect a further state in which the display object is located between a first object and a second object and thereafter at least one of the first object and the second object is moved, and a distance between the first object and the second object is not increased for a longer period of time than a predetermined time, and
    the processor is configured to start to change the display object at a time of detecting the movement of said at least one of the first object and the second object.

6. The display device according to claim 5, wherein, when it is detected that the display object is located between the first object and the second object and thereafter at least one of the first object and the second object is moved, and the distance between the first object and the second object is increased before the elapse of the predetermined time, the processor is configured to display a reverse change to return the changed display object to its original state.

7. The display device according to claim 1, wherein the detector is configured to detect the action of the object through detection of capacitance.

8. The display device according to claim 1, wherein the detector is configured to detect the action of the object through detection of either one of visible light and invisible light.

* * * * *